United States Patent
Terashima

(10) Patent No.: US 11,287,661 B2
(45) Date of Patent: Mar. 29, 2022

(54) WEARABLE DISPLAY DEVICE HAVING FLEXIBLE BOARD TRANSMITTING SIGNAL

(71) Applicant: SEIKO EPSON CORPORATION, Tokyo (JP)

(72) Inventor: Yasuhiro Terashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 20 days.

(21) Appl. No.: 16/887,981

(22) Filed: May 29, 2020

(65) Prior Publication Data

US 2020/0379264 A1 Dec. 3, 2020

(30) Foreign Application Priority Data

May 30, 2019 (JP) .............................. JP2019-101039

(51) Int. Cl.
*G09G 5/00* (2006.01)
*G02B 27/01* (2006.01)

(52) U.S. Cl.
CPC ..... *G02B 27/0176* (2013.01); *G02B 27/0149* (2013.01); *G09G 5/003* (2013.01); *G02B 2027/0158* (2013.01); *G02B 2027/0178* (2013.01); *G09G 2380/02* (2013.01)

(58) Field of Classification Search
CPC ............ G02B 27/0176; G02B 27/0149; G02B 2027/0158; G09G 5/003
USPC ............................................................ 345/8
See application file for complete search history.

(56) References Cited

U.S. PATENT DOCUMENTS

| | | | | |
|---|---|---|---|---|
| 10,674,141 | B1* | 6/2020 | Zhang | G02B 27/0179 |
| 2003/0202031 | A1* | 10/2003 | Nakamura | B41J 25/316 |
| | | | | 347/20 |
| 2006/0274042 | A1* | 12/2006 | Krah | G06F 3/03543 |
| | | | | 345/163 |
| 2008/0029298 | A1* | 2/2008 | Booth | H05K 1/0224 |
| | | | | 174/350 |
| 2011/0094790 | A1* | 4/2011 | Lin | H05K 1/028 |
| | | | | 174/350 |
| 2013/0113973 | A1* | 5/2013 | Miao | G09G 3/003 |
| | | | | 348/333.01 |
| 2015/0185483 | A1 | 7/2015 | Hiraide | |
| 2016/0269720 | A1* | 9/2016 | Patel | H04N 13/344 |
| 2016/0366399 | A1* | 12/2016 | Tempel | H04N 13/344 |
| 2017/0273171 | A1* | 9/2017 | Codd | H05K 1/189 |

FOREIGN PATENT DOCUMENTS

JP 2015-126336 A 7/2015

\* cited by examiner

*Primary Examiner* — Jonathan M Blancha
(74) *Attorney, Agent, or Firm* — Oliff PLC

(57) ABSTRACT

A wearable display device includes a first display device and a second display device configured to display images correspondingly to left and right eyes, a first flexible board extending from the first display device to the second display device and configured to transmit a signal, and a second flexible board disposed overlapping the first flexible board. The first flexible board includes a surface overlapping the second flexible board and an opposite surface from the surface overlapping the second flexible board, the opposite surface being shielded, and the second flexible board includes a surface overlapping the first flexible board and an opposite surface from the surface overlapping the first flexible board, the opposite surface being shielded.

11 Claims, 20 Drawing Sheets

WEARABLE DISPLAY DEVICE HAVING FLEXIBLE BOARD TRANSMITTING SIGNAL

The present application is based on, and claims priority from JP Application Serial Number 2019-101039, filed May 30, 2019, the disclosure of which is hereby incorporated by reference herein in its entirety.

BACKGROUND

1. Technical Field

The present disclosure relates to a wearable display device that provides a virtual image and the like to a viewer.

2. Related Art

As a coupling method for transmission in a wearable display device, a configuration using a harness cable structure in a see-through head-mounted display (HMD), which is an aspect of wearable display devices, is known (JP-A-2015-126336).

In the case where a harness cable structure is used as in the device of JP-A-2015-126336, the harness cable may be thick and heavy in an HMD, which is strongly desired to be downsized. For example, in the case where a cable is laid from one side to the other in the left-right direction in a wearable display device having paired configurations corresponding to the left and right eyes, the thickness of the cable is required to be small. Further, in the case where the amount of data such as image data is increased in transmission and the processing speed is increased, it is also important to take countermeasures against noise received from the outside.

SUMMARY

A wearable display device according to an aspect of the present invention includes a first display device and a second display device configured to display images correspondingly to left and right eyes, a first flexible board extending from the first display device to the second display device and configured to transmit a signal, and a second flexible board disposed overlapping the first flexible board. The first flexible board includes a surface overlapping the second flexible board and an opposite surface from the surface top of the second flexible board, the opposite surface being shielded, and the second flexible board includes a surface overlapping the first flexible board and an opposite surface from the surface overlapping the first flexible board, the opposite surface being shielded.

DESCRIPTION OF EMBODIMENTS

First Embodiment

A wearable display device according to a first embodiment of the present disclosure will be described below in detail with reference to the drawings.

Figure 1:
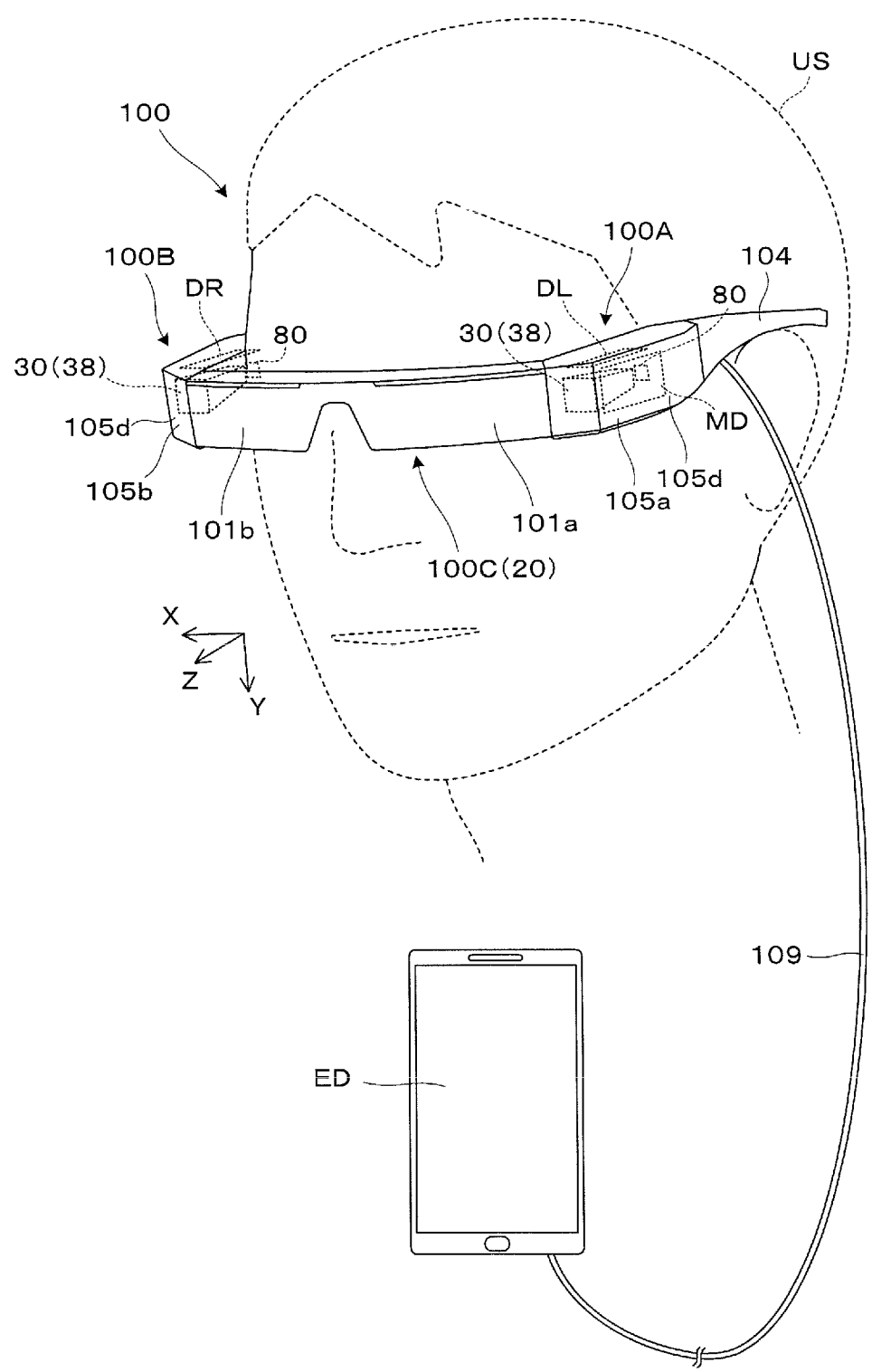
FIG. 1 is a perspective view illustrating an overview of a wearable display device according to a first embodiment.

As illustrated in FIGS. 1 to 4, a wearable display device 100 of the embodiment is a head-mounted display (HMD) having an eyeglasses-like external appearance. In FIG. 1 and the like, X, Y, and Z are an orthogonal coordinate system. The +X direction corresponds to the lateral direction in which both eyes of a viewer wearing the wearable display device 100 are located, the +Y direction corresponds to a downward direction orthogonal to the lateral direction in which both eyes of the viewer are located, and the +Z direction corresponds to a forward direction or a front direction as viewed from the viewer.

As illustrated in FIG. 1 and the like, with the wearable display device 100, a viewer or a user US wearing the wearable display device 100 can visually recognize a virtual image, and can view an external image in a see-through manner. The wearable display device 100 can be communicatively coupled to an external device ED such as a smartphone through a cable 109, and can form a virtual image corresponding to an image signal input from the external device ED, for example. The wearable display device 100 includes a first display device 100A and a second display device 100B. The first display device 100A and the second display device 100B are members that form a virtual image for the left eye and a virtual image for the right eye, respectively. The first display device 100A for the left eye includes a first virtual image forming optical part 101a that covers the front side of the eye of the viewer in a visually transparent manner, and a first image forming body part 105a that forms image light. The second display device 100B for the right eye includes a second virtual image forming optical part 101b that covers the front side of the eye of the viewer in a visually transparent manner, and a second image forming body part 105b that forms image light. In other words, images corresponding to the left and right eyes are displayed by the first display device 100A and the second display device 100B.

Figure 3:
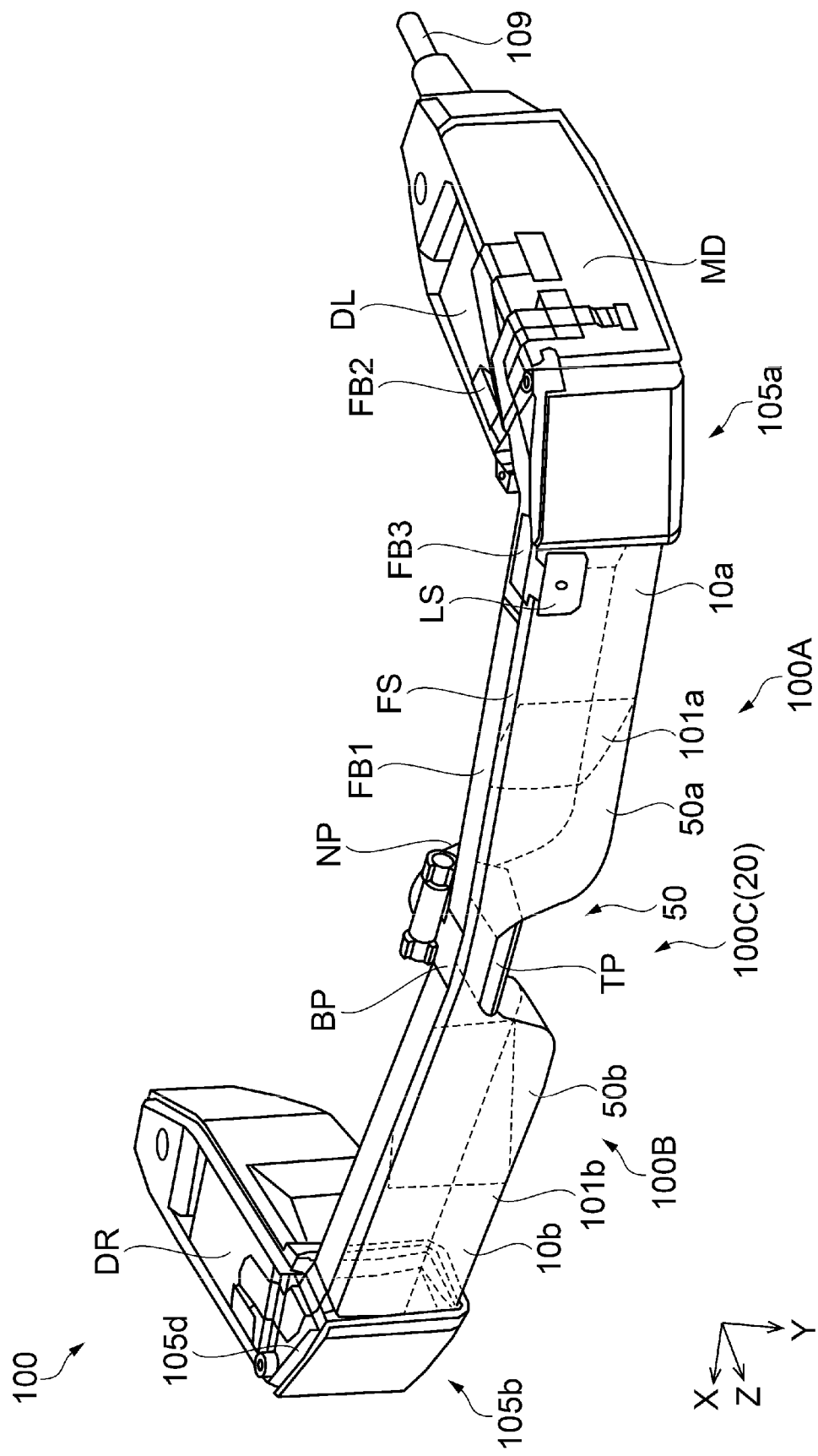
FIG. 3 is a perspective view illustrating an internal structure of the wearable display device.
Figure 7:
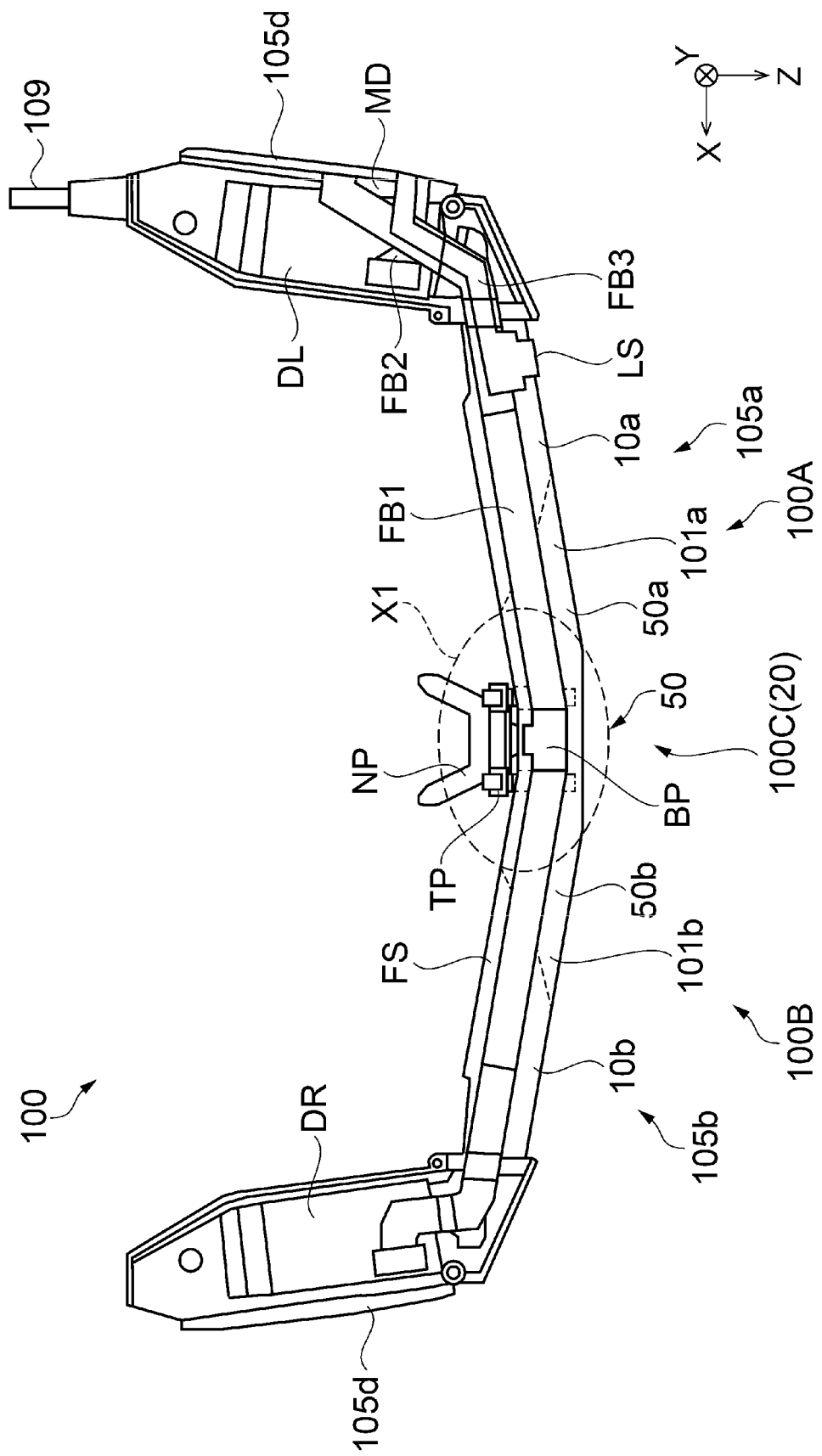
FIG. 7 is a plan view illustrating an internal structure of the wearable display device.

Temples 104, which are earpieces extending rearward from the side surface of the head, are attached to rear portions of the first and second image forming body parts 105a and 105b to maintain the wearing condition of the wearable display device 100 by making contact with the ears, the temples or the like of the viewer. In addition, as illustrated in FIGS. 3 and 7 and the like, a nose pad NP that constitutes a support part together with the temple 104 is provided in a recess formed between the first and second virtual image forming optical parts 101a and 101b, and the nose pad NP enables positioning of the virtual image forming optical parts 101a and 101b and the like with respect to the eyes of the viewer. Note that the nose pad NP is assembled to a central member 50 of a visually transparent light-guiding unit 100C that integrates the first display device 100A and the second display device 100B with a fitting TP. The visually transparent light-guiding unit 100C and the central member 50 constituting the same will be described later.

The first and second virtual image forming optical parts 101a and 101b form the visually transparent light-guiding unit 100C as an integrated member coupled together at the center rather than as separate members. The visually transparent light-guiding unit 100C includes a pair of light-guiding members 10a and 10b and the central member 50. The pair of light-guiding members 10a and 10b are a pair of optical members that contribute to virtual image formation while propagating image light therein. The central member 50 includes a pair of light transmission parts 50a and 50b. The light transmission part 50a on one side is joined to the light-guiding member 10a on one side, and the light transmission part 50b on the other side is joined to the light-guiding member 10b on the other side. The visually transparent light-guiding unit 100C is a composite light-guiding device 20 that provides an image for both eyes to the viewer through light guiding, and is supported by an outer case 105d at both ends, i.e., the tip end sides of the light-guiding members 10a and 10b.

In this embodiment, the visually transparent light-guiding unit 100C includes a flat surface FS that extends flush from the first display device 100A to the second display device 100B as the top surface, i.e., the +Y side surface.

A cover member FC (FPC cover) is provided as a cover structure at the top surface of the visually transparent light-guiding unit 100C. In the space between the cover member FC and the visually transparent light-guiding unit 100C, a thin and narrow space is defined and a cable that electrically couples the first image forming body part 105a and the second image forming body part 105b is extended.

The internal structure and the like of the wearable display device 100 will be described below with reference to FIGS. 1 to and 5 and the like. As illustrated in FIG. 1, the first image forming body part 105a includes a display element 80, a lens barrel 38, a main circuit board MD, a left-eye circuit board DL and the like in the outer case 105d having a cover shape. The second image forming body part 105b includes the display element 80, the lens barrel 38, a right-eye circuit board DR and the like in the outer case 105d. Note that the outer case 105d of the first image forming body part 105a may be referred to as a first outer case 105d. Likewise, the outer case 105d of the second image forming body part 105b may be referred to as a second outer case 105d. In addition, the outer case 105d is composed of, for example, a magnesium alloy or the like.

For example, in the first image forming body part 105a, the display element 80 housed in the first outer case 105d is a display device that emits image light to form an image corresponding to a virtual image for the left eye. The projection lens 30 emits image light from the display element 80, and constitutes a part of the imaging system in the first virtual image forming optical part 101a. As a part of the projection lens 30, the lens barrel 38 holds an image forming optical element (not illustrated) that constitutes the projection lens 30.

Note that, also in the second image forming body part 105b, the display element 80 housed in the second outer case 105d and the projection lens 30 including the lens barrel 38 perform the same function so as to form an image corresponding to a virtual image for the right eye.

Figure 4:
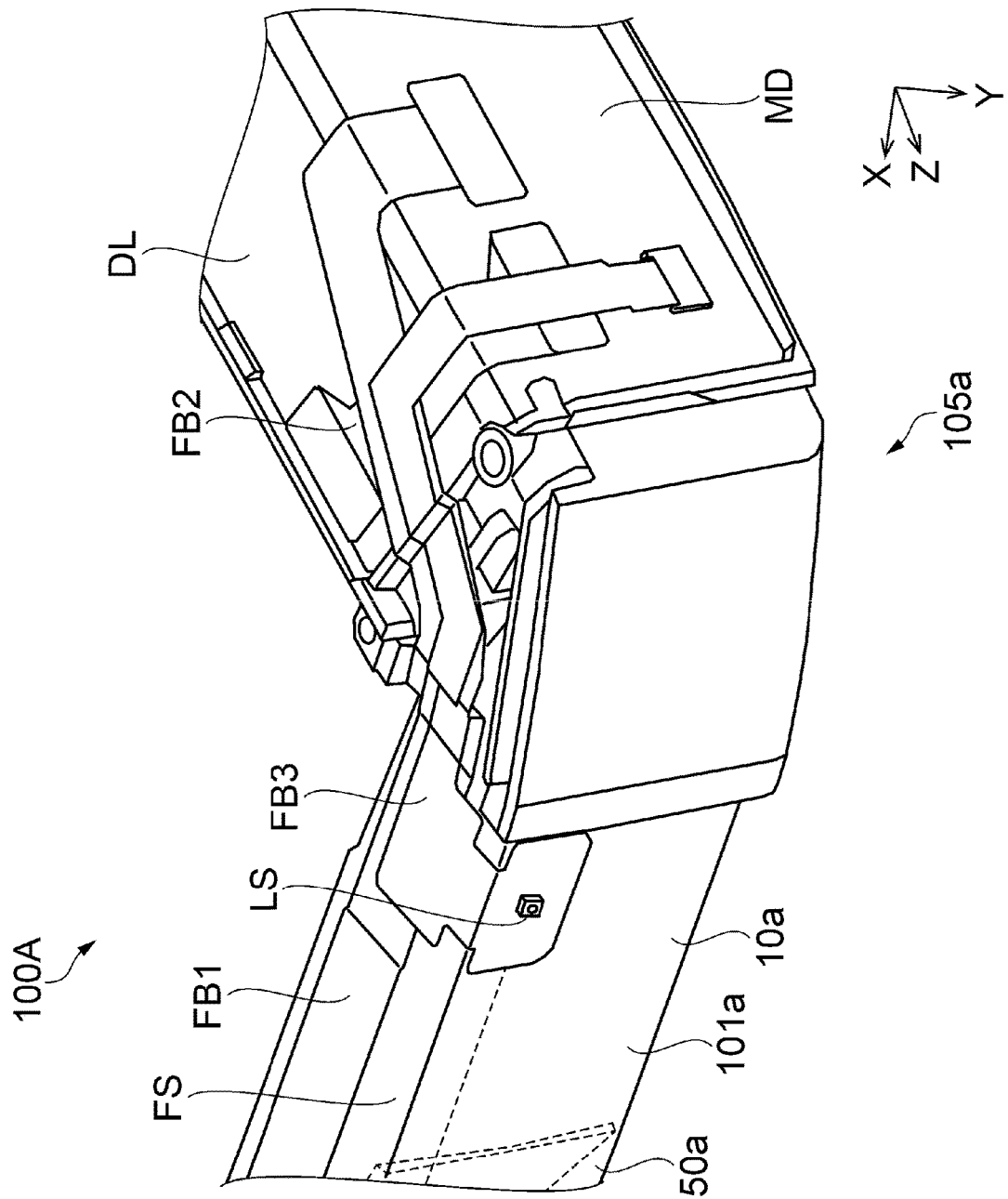
FIG. 4 is a partially enlarged view of FIG. 3.
Figure 5:
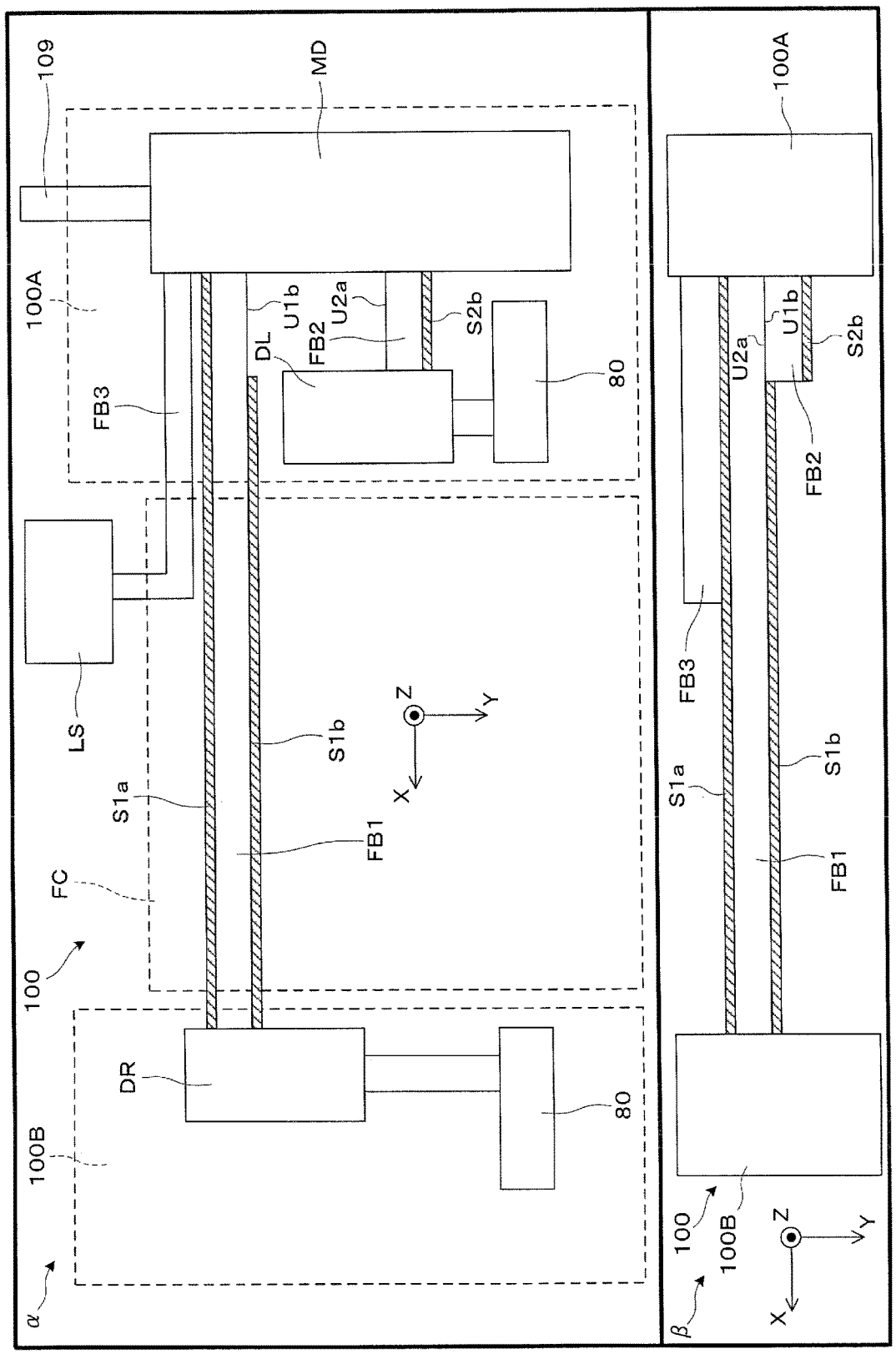
FIG. 5 is a schematic block diagram illustrating a circuit configuration of the wearable display device.

The main circuit board MD is a signal processing board that processes a signal including external information. Here, the external information is typically image data from the external device ED. The main circuit board MD has a function of an interface to the outside, and manages and controls the display operations of the left-eye circuit board DL and the right-eye circuit board DR. As such, as illustrated in FIGS. 3 to 5, the main circuit board MD is coupled to each part through a cable.

The left-eye circuit board DL is a drive circuit board that drives the display element 80 in the first image forming body part 105a, and operates under the control of the main circuit board MD.

Likewise, the right-eye circuit board DR is a drive circuit board that drives the display element 80 in the second image forming body part 105b, and operates under the control of the main circuit board MD.

Figure 2:
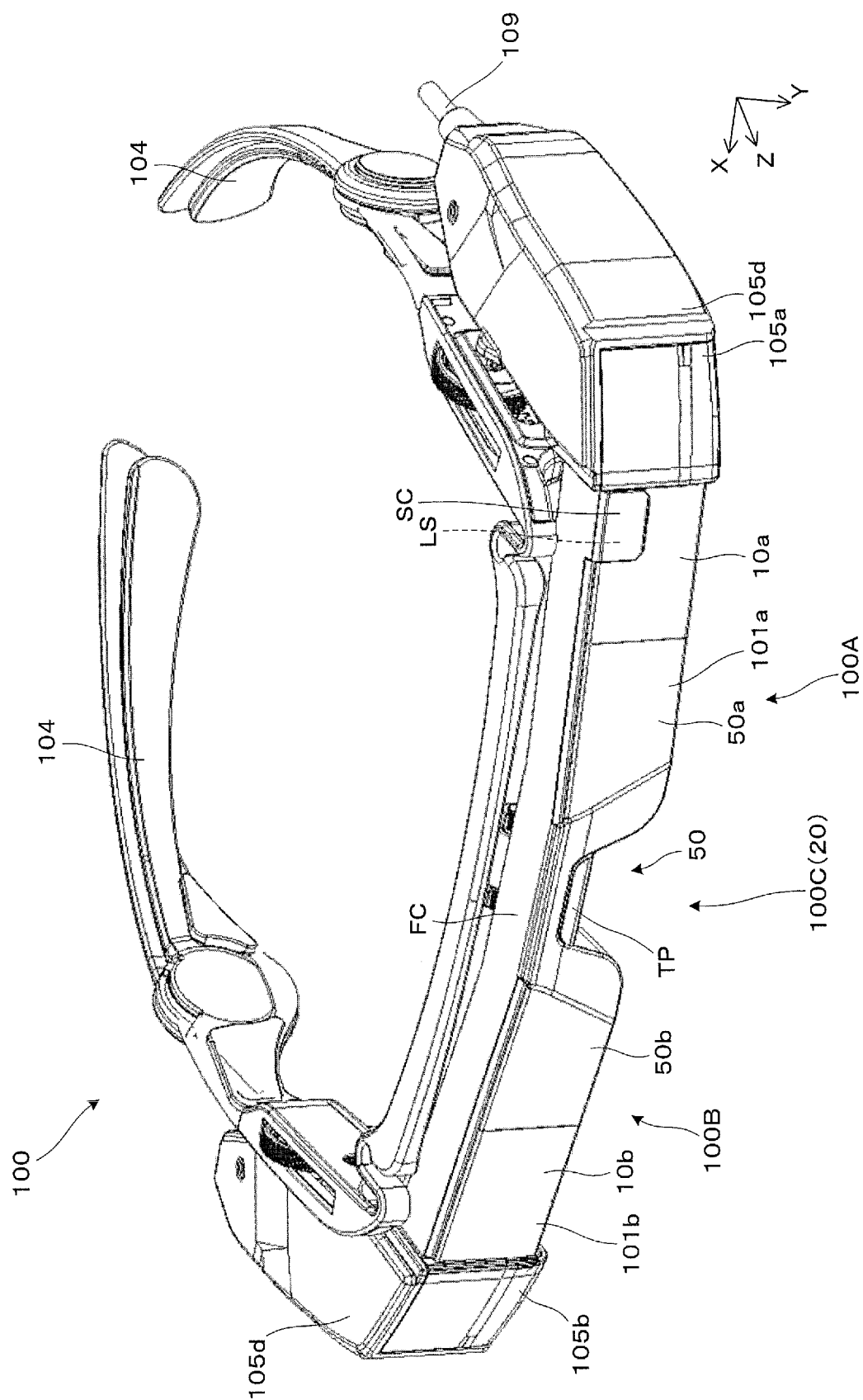
FIG. 2 is a perspective view illustrating an external appearance of an exemplary configuration of the wearable display device.

In addition to the above, in this embodiment, an illuminance sensor LS is provided. The illuminance sensor LS is an ambient light sensor (ALS) and is an external light sensor that measures the ambient light intensity in accordance with reactions of the viewer. As such, as illustrated in FIG. 2 to FIG. 4, the illuminance sensor LS is disposed toward the +Z direction corresponding to the forward direction or the front direction as viewed from the viewer, and operates under the control of the main circuit board MD so as to enable detection of the amount of light entering the eye of the viewer.

Note that the various circuit boards such as the main circuit board MD have a structure in which a wiring line is formed on the surface of the insulating resin board and/or inside the insulating resin board, and an IC and/or an electronic element is mounted in the surface.

In this embodiment, a flexible board, i.e., a flexible printed circuit (FPC) board is employed as a cable for coupling the main circuit board MD to the above-described parts. Specifically, first, as a first flexible board that couples the main circuit board MD and the right-eye circuit board DR, a right-eye flexible board FB1 extends from the first display device 100A to the second display device 100B. In other words, the right-eye flexible board FB1 extends along the flat surface FS, which is the top surface extending flush from the first display device 100A to the second display device 100B. In addition, a left-eye flexible board FB2 is provided as a second flexible board that couples the main circuit board MD and the left-eye circuit board DL. Further, an illuminance sensor flexible board FB3 that couples the main circuit board MD and the illuminance sensor LS is provided. Note that in this embodiment, for example, the illuminance sensor flexible board FB3 is also the second flexible board. Specifically, in the following description, a flexible board (right-eye flexible board FB1) that extends from the first display device 100A to the second display device 100B and transmits a signal is the first flexible board, and a flexible board other than the first flexible board (the left-eye flexible board FB2 and the illuminance sensor flexible board FB3) that is disposed on the first flexible board in an overlapping manner is the second flexible board. Note that, in the following description, the above-described flexible boards may be simply referred; for example, the right-eye flexible board FB1 may be referred to simply as a flexible board FB1 or the like.

Further, in this embodiment, as illustrated in FIG. 4, the plurality of flexible boards FB1 to FB3 are disposed in a partially overlapping manner. Note that in the illustrated example, the flexible board FB2 is disposed lowermost (on the +Y side), the flexible board FB1 is disposed on the flexible board FB2 in an overlapping manner, and the flexible board FB3 is disposed uppermost (on the −Y side).

Configurations of the flexible boards FB1 to FB3 will be described below with reference to the schematic block diagram of FIG. 5. Note that, in the illustration, portions indicated with hatching on the surfaces of the flexible boards FB1 to FB3 indicate shielded portions, and such portions are illustrated as a shield part S1a or the like, for example. When covered with the shield part S1a or the like, the flexible boards are electromagnetically shielded. More specifically, the shield part (e.g., the shield part S1a) on the upper side (the −Y side) or the shield part (e.g., the shield part S1b) on the lower side (the +Y side) is electrically coupled through coupling via a through hole with a negative potential (a GND wiring) of the flexible boards FB1 to FB3, and a signal line or the like therebetween is shielded. Note that, as necessary, the shield part S1a and the like are further coupled to an external device so as to be grounded (GND), or in other words, coupled with a reference potential (a line of 0 volt or less) in the external device. When shielded in the above-described manner, the signal lines and the like in the flexible board can avoid influences of noise from the outside of the flexible board.

In addition, the shield or shielding part is a part that is disposed so as to cover a signal line of the flexible boards FB1 to FB3 as with the shield part S1a and the like, and in the case of a double-sided shield, the upper and lower shields that constitute the double-sided shield are electrically coupled through coupling via a through hole or the like such that the high-speed signal line is covered from both sides.

A state α illustrated in the upper section in FIG. 5 illustrates a circuit configuration in the wearable display device 100, i.e., an arrangement and a connection state of the main circuit board MD, the left-eye circuit board DL, the right-eye circuit board DR, and the like. In addition, the lower section of FIG. 5 schematically illustrates, as a state β, a state where the partially overlapping flexible boards FB1 to FB3 overlap in the state α. Note that the arrangement of the flexible boards FB1 to FB3 in the vertical direction (the +Y direction and the −Y direction) corresponds to the case illustrated in FIG. 4.

Of the flexible boards FB1 to FB3, the right-eye flexible board FB1, which is the first flexible board, and the left-eye flexible board FB2, which is the second flexible board, operate for transmitting image data. As such, the right-eye flexible board FB1 and the left-eye flexible board FB2 include a high-speed signal line so as to enable data transmission of high-quality video images, for example. Here, while the high-speed signal line is a line that enables data transmission of the video image as described above, it is conceivable to assume that the line of approximately 100 MHz in parallel transfer, and approximately 400 MHz to 20 GHz in serial transfer, for example. For example, when it is assumed that a mobile device or the like is used as an external device for transmitting image data, the frequency is assumed to be approximately 500 MHz when the transmission speed is 1 Gbps in MIPI of image transmission, which is a data transmission standard in a mobile device. While it is conceivable that the illuminance sensor flexible board FB3 also includes a high-speed signal line, it is not necessarily required to employ the high-speed signal line, and therefore the illuminance sensor flexible board FB3 does not include the high-speed signal line here.

As described above, the right-eye flexible board FB1 extends from the first display device 100A to the second display device 100B, and transmits various signals and the like to the second display device 100B. Specifically, image data for the right eye is output from the main circuit board MD to the right-eye circuit board DR through the right-eye flexible board FB1. In addition, the right-eye flexible board FB1 functions also as a power supply cable for driving parts of the second display device 100B.

The left-eye flexible board FB2 transmits various signals and the like to the first display device 100A. Specifically, image data for the left eye is output from the main circuit board MD to the left-eye circuit board DL through the left-eye flexible board FB2. In addition, the left-eye flexible board FB2 functions also as a power supply cable for driving parts of the first display device 100A.

As described above, in this embodiment, a plurality of flexible boards including a high-speed signal line are used as cables, and further the boards are provided in an overlapping manner, and thus, a wiring line having a thin and space-saving configuration can be achieved while achieving transmission of a large amount of data.

Here, in the case where a high-speed signal line is employed as described above, it is particularly important to take countermeasures against noise received from the outside. In view of this, in this embodiment, the right-eye flexible board FB1 and the left-eye flexible board FB2 including the high-speed signal line are configured to be entirely shielded.

As a specific aspect, in the case of FIG. 5, the surfaces opposite to the adjoining surface are shielded at a location where the right-eye flexible board FB1 and the left-eye flexible board FB2 overlap. In the illustrated case, first, the surface of the right-eye flexible board FB1 on the side (the −Y side) opposite to the surface adjoining the left-eye flexible board FB2 is provided with the shield part S1a so as to be shielded. On the other hand, in the surface on the side (the +Y side) on which it adjoins to the left-eye flexible board FB2, an adjoining surface U1b adjoining the left-eye flexible board FB2 is not shielded. Note that, even on the side (the +Y side) on which it adjoins to the left-eye flexible board FB2, a portion of the surface that does not adjoins to the left-eye flexible board FB2 is provided with the shield part S1b so as to be shielded.

In addition, the surface of the left-eye flexible board FB2 on the side (the +Y side) opposite to the surface adjoining the right-eye flexible board FB1 is provided with the shield part S2b so as to be shielded. On the other hand, an adjoining surface U2a adjoining the right-eye flexible board FB1 is not shielded.

With the above-described configuration, the right-eye flexible board FB1 and the left-eye flexible board FB2 including the high-speed signal line are entirely shielded when the shield parts S1a, S1b and S2b are electrically coupled in the overlapping state as illustrated in the state R.

Note that each of the shield parts S1a, S1b and S2b entirely covers the right-eye flexible board FB1 and the left-eye flexible board FB2, and is coupled to the external device ED illustrated in FIG. 1 so as to be grounded, i.e., coupled to a negative potential (a line of 0 volt or less) in the external device ED, for example.

In addition, various aspects of the configurations of the shield parts S1a, S1b and S2b are conceivable, and it is conceivable to employ a configuration using a conductive paste, a configuration using a conductive sheet member, and a configuration using a mesh ground (ground mesh line), and the like. In addition, it is also possible to employ a configuration in which an electromagnetic whole shielding film is bonded, and a configuration in which the flexible board (FPC) is a double-sided black integrated electromagnetic shield FPC. In the case where a double-sided black integrated electromagnetic shield FPC is used, a light blocking effect is also expected. Further, various shielding members may be bonded to the cover member FC (FPC cover) side. In addition, it is also conceivable to employ a configuration in which plating is provided on the surface of a resin material as an electromagnetic shield.

Figure 6:
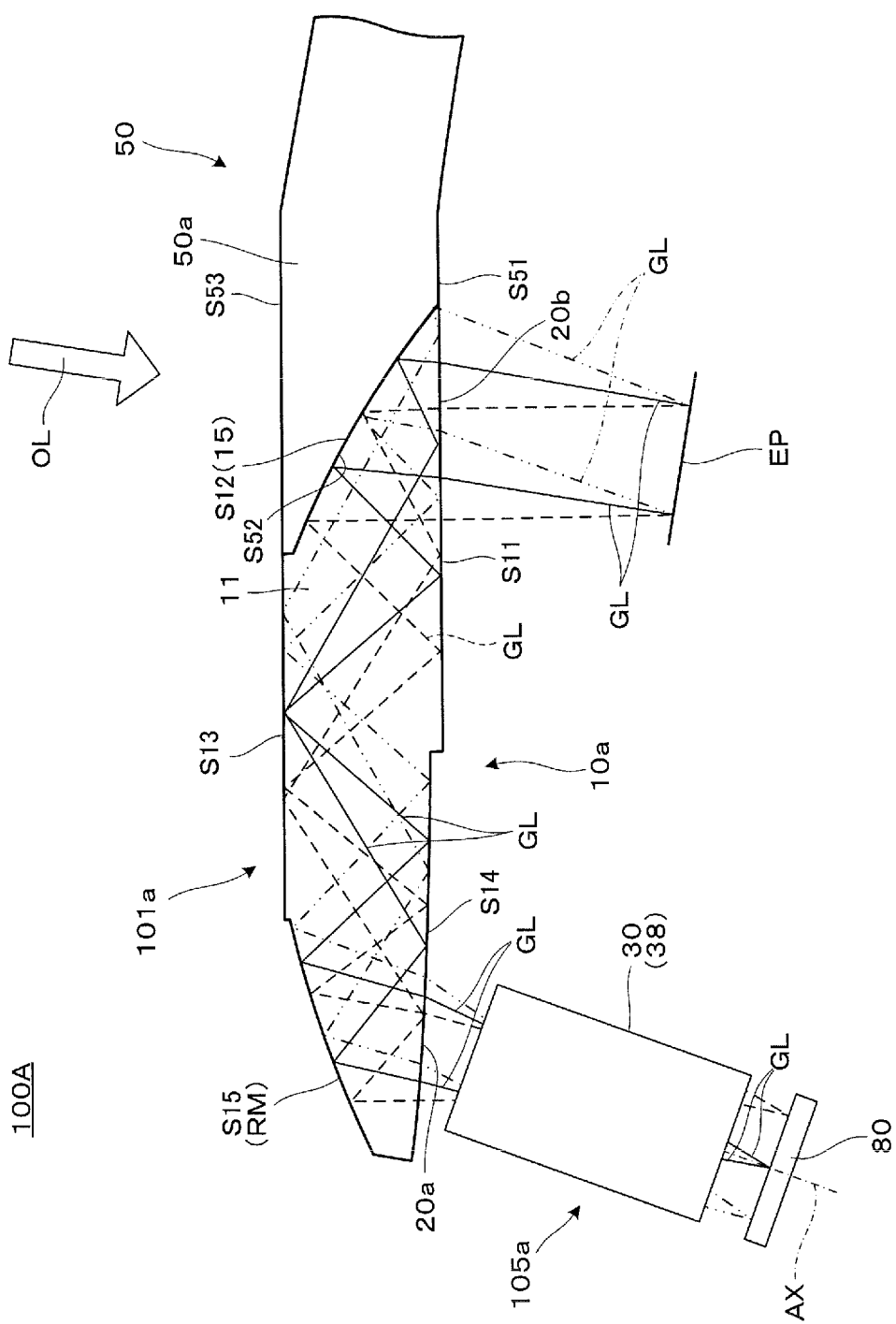
FIG. 6 is a schematic plan view illustrating light paths of image light.

FIG. 6 is a diagram illustrating a portion of the first display device 100A for particularly describing an optical structure of the first virtual image forming optical part 101a. As described with reference to FIG. 1 and the like, the wearable display device 100 is composed of the first display device 100A and the second display device 100B. However, since the first display device 100A and the second display device 100B have a symmetrical structure in the left-right direction, only the first display device 100A will be described, and the description of the second display device 100B will be omitted.

An overview of optical paths of image light GL will be described below with reference to FIG. 6. The light-guiding member 10a guides the image light GL from the projection lens 30 toward the eye of the viewer through reflection at first to fifth surfaces S11 to S15, and the like. Specifically, the image light GL from the projection lens 30 is first impinges on the fourth surface S14 and reflected by the fifth surface S15, which is an inner surface of a reflection film RM. Then, the image light GL again internally impinges on the fourth surface S14 so as to be totally reflected, then impinges on the third surface S13 so as to be totally reflected, and then, impinges on the first surface S11 so as to be totally reflected. The image light GL totally reflected by the first surface S11 impinges on the second surface S12 so as to partially pass through a half mirror 15 provided at the second surface S12 while being partially reflected. Then the image light GL again impinges on and passes through the first surface S11. The image light GL that has passed through the first surface S11 enters an exit pupil EP where the eye of the viewer is present as a substantially parallel luminous flux. In other words, the viewer views an image formed by the image light as a virtual image.

Next, the light transmission part 50a will be described prior to the description of the matter related to external images. As described above, the light transmission part 50a is a member integrally fixed with the light-guiding member 10, and assists the visually transparent function of the light-guiding member 10a. The light transmission part 50a includes a first transmission surface S51, a second transmission surface S52, and a third transmission surface S53 as surfaces having an optical function. The second transmission surface S52 is disposed between the first transmission surface S51 and the third transmission surface S53. The first transmission surface S51 is on an extended surface of the first surface S11 of the light-guiding member 10, the second transmission surface S52 is a curved surface that is integrally joined to the second surface S12, and the third transmission surface S53 is on an extended surface of the third surface S13 of the light-guiding member 10.

The first virtual image forming optical part 101a allows the viewer to visually recognize image light with the light-guiding member 10a, and allows the viewer to view a less distorted external image in the state where the light-guiding member 10a and the light transmission part 50a are combined. At this time, since the third surface S13 and the first surface S11 are flat surfaces that are substantially parallel to each other (visibility: approximately 0), almost no aberration or the like is caused. Further, the third transmission surface S53 and the first transmission surface S51 are flat surfaces that are substantially parallel to each other. Further, since the third transmission surface S53 and the first surface S11 are flat surfaces that are substantially parallel to each other, almost no aberration or the like is caused. Thus, the viewer views an external image with no distortion through the light transmission part 50a.

A structure related to attaching of the flexible board in the wearable display device will be described with reference to FIG. 7 and the like.

Figure 9:
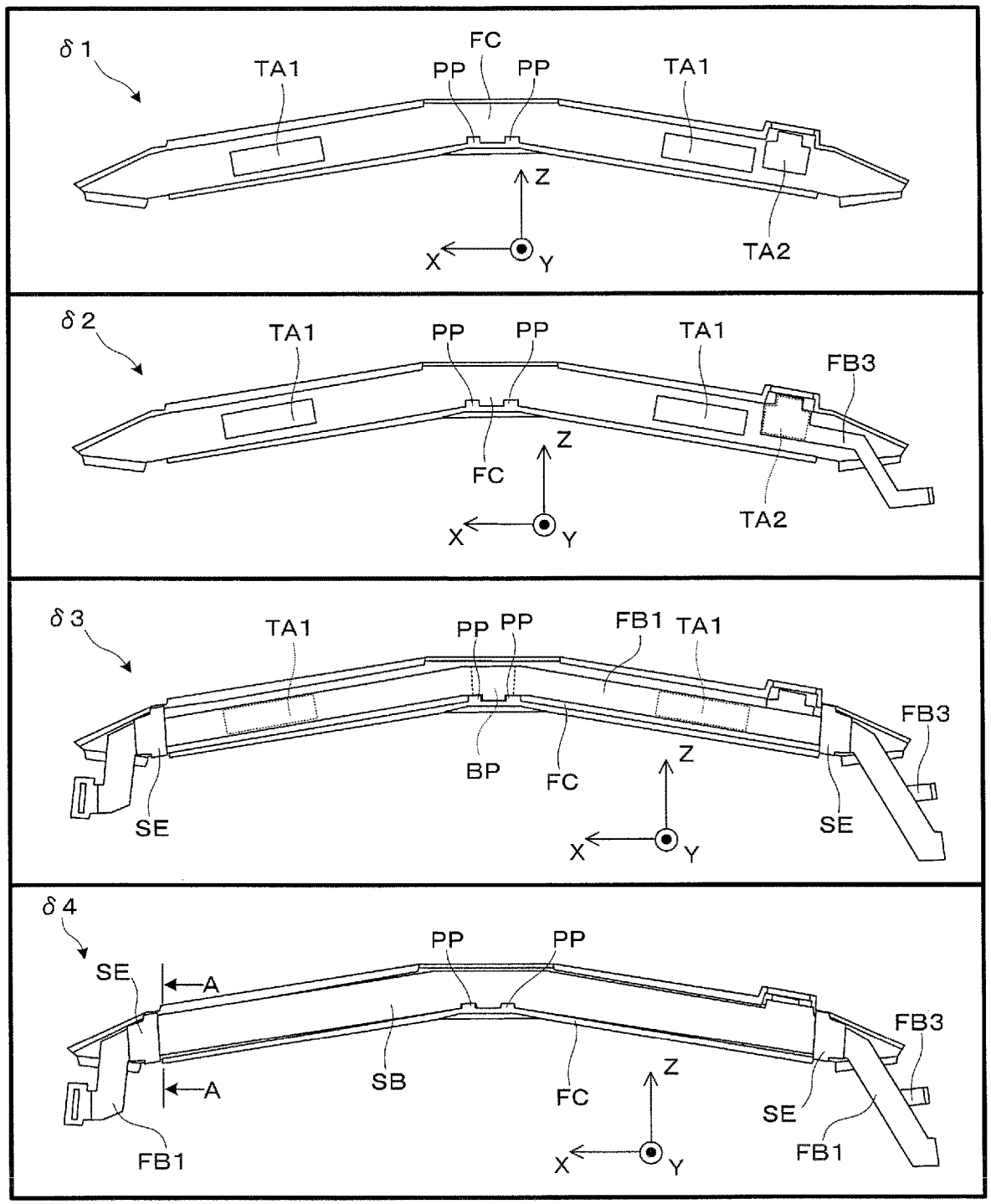
FIG. 9 is a schematic diagram for describing an attaching step of a flexible board.
Figure 10:
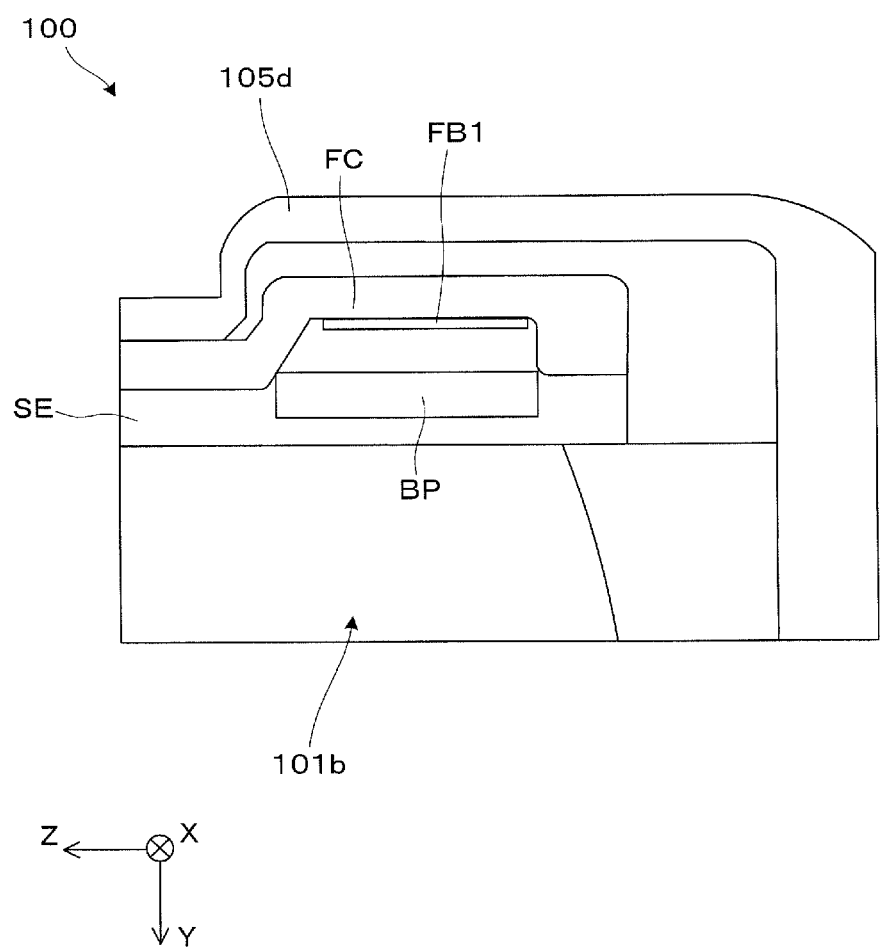
FIG. 10 is a partially enlarged cross-sectional side view of the wearable display device.

FIG. 7 is a diagram illustrating an internal structure of the wearable display device 100, and is a plan view corresponding to the perspective view of FIG. 3. In addition, in FIG. 8, a state γ1 illustrated in the upper section is an enlarged view of a part indicated with a dashed line X1 in FIG. 7. Further, a state γ2 illustrated in the lower section illustrates a state where the cover member FC (FPC cover) covering the flexible board FB1 is attached in the state γ1. FIG. 9 is a schematic view for describing an attaching step of the flexible board FB1 and the like to the cover member FC. FIG. 10 is a partially enlarged cross-sectional side view of a part including the cover member FC in the wearable display device 100, and is a cross-sectional view taken along a line A-A illustrated in FIG. 9.

The cover member FC is composed of, for example, a transparent resin member, and extends from one side to the other in the left-right direction (the +X direction and the −X direction) so as to cover the right-eye flexible board FB1, which is the first flexible board.

Figure 8:
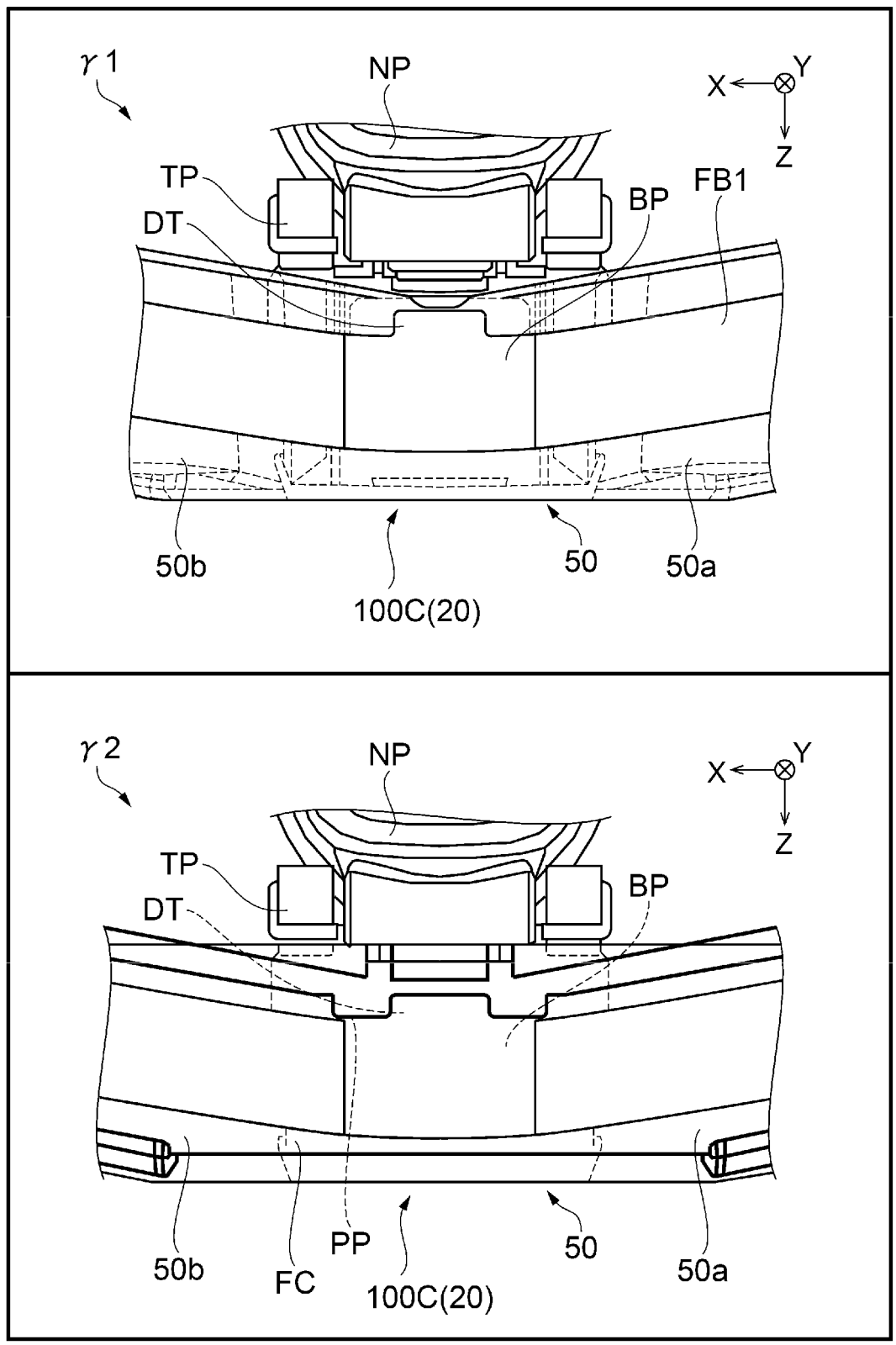
FIG. 8 is a partially enlarged plan view of the wearable display device.

On the other hand, as illustrated in FIGS. 7 and 8 for example, in the right-eye flexible board FB1, which is the first flexible board, a plate-shaped reinforcing plate BP having a protruding shape on one side of a rectangular shape is attached at a center position corresponding to the fitting TP in the right-eye flexible board FB1 as a board positioning member for positioning with respect to the cover member FC. The reinforcing plate BP is, for example, a plate member composed of polyimide or the like and having a thickness of, for example, an approximately 0.2 mm, and supports the right-eye flexible board FB1. Specifically, the reinforcing plate BP includes a protrusion DT having a protruding shape and is fitted with a notch PP provided in the cover member FC as illustrated in the state γ2. Specifically, by fitting the protrusion DT of the reinforcing plate BP to the notch PP of the cover member FC, the right-eye flexible board FB1 is positioned with respect to the cover member FC. While the reinforcing plate BP is provided on the upper side (the −Y side) of the right-eye flexible board FB1 in the illustrated example, the reinforcing plate BP may be provided on the opposite side. Typically, a flexible board is very thin in many cases, and it is highly possible that an elongated member, such as the flexible board FB1, that does not have a right-angle bent portion is difficult to be stably fixed. Therefore, here, the reinforcing plate BP is provided at the center portion of the flexible board FB1 as a positioning part such that the flexible board FB1 is reliably fixed to the cover member FC at a predetermined position.

An exemplary attaching of the flexible board to the cover member FC will be described below with reference to FIG. 9. Here, regarding the flexible boards FB 1 to FB3, attaching of the illuminance sensor flexible board FB3 and the right-eye flexible board FB1 is illustrated as an example.

First, as illustrated in a step δ1, a first tape member TA1 that fixes the flexible board FB1, which is the first flexible board, and a second tape member TA2 that fixes the flexible board FB3, which is the second flexible board are attached to a back side (the +Y side) surface of the cover member FC, i.e., to the attaching surface of the flexible boards FB1 and FB3. The first tape member TA1 and the second tape member TA2 are adhesive members and are disposed such that the first tape member TA1 and the second tape member TA2 do not overlap each other as illustrated in the drawing. Thus, increase in thickness in the Y direction due to the overlapping of the tape members is suppressed.

Next, as illustrated in a step δ2, the flexible board FB3 (the second flexible board) is bonded to the second tape member TA2 and fixed at a predetermined position in the cover member FC.

Further, as illustrated in a step δ3, the flexible board FB1 (the first flexible board) is bonded to the second tape member TA2, and is fixed at a predetermined position in the cover member FC. In addition, a sealing member SE is provided at predetermined positions on both the right and left ends of the flexible board FB1 or the cover member FC. The sealing member SE is provided at a boundary between the inside and the outside of the outer case 105d illustrated in FIG. 2 and the like, and is composed of, for example, a rubber packing or the like. The sealing member SE is a member for maintaining a liquid-tight state of the interior of the outer case 105d.

Further, as illustrated in a step δ4, a sheet member SB that covers the flexible board FB1 from the lower side (the +Y side) is provided. The sheet member SB is, for example, a black resin member, and avoids or reduces a situation where the flexible board FB1 is visible to a viewer (user) and a situation where unintended light is reflected to the flexible board FB1 and the visibility of the viewer is affected.

Although description and illustration in the drawings are omitted, the flexible board FB2 (the second flexible board) is attached to the lower side (the +Y side) of the flexible board FB1.

When attached in the above-mentioned manner, the flexible board FB1 is maintained in a state where it is spaced apart from the visually transparent light-guiding unit 100C, i.e., the light-guiding device 20 in the state where the assembly of each part is completed as illustrated in FIG. 10.

In the case of the above-described configuration, the flexible board FB1, which is the first flexible board, is first attached to the cover member FC while being supported and reinforced by the reinforcing plate BP at the center position. Further, the flexible board FB1 may be bonded along the cover member FC with the tape member TA1, and may be fixed at both the right and left end sides with the sealing member SE. In other words, the flexible board FB1 is reliably fixed to the cover member FC.

In addition, the cover member FC is first attached to, for example, the fitting TP of the nose pad NP at a center position where the notch PP that fits with the reinforcing plate BP is disposed, and thus the cover member FC is fixed to the visually transparent light-guiding unit 100C that integrates the first display device 100A and the second display device 100B. Further, the cover member FC is fixed to the first display device 100A and the second display device 100B at both the right and left ends in the +X direction and the −X direction. In other words, the cover member FC is fixed to the first display device 100A and the second display device 100B at three locations, namely, the center and both ends.

Figure 11:
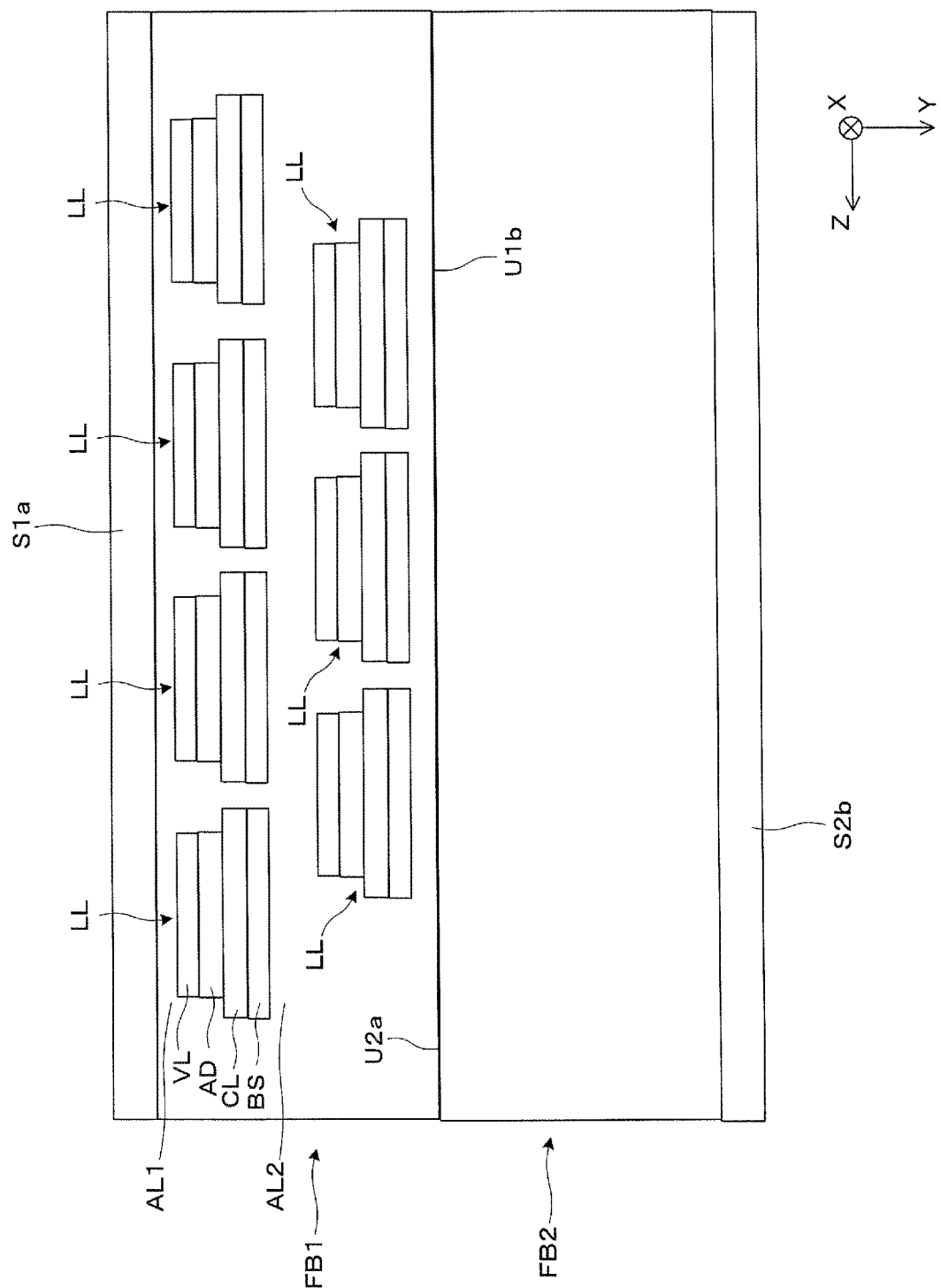
FIG. 11 is a schematic cross-sectional view illustrating an exemplary structure of the flexible board.

An exemplary internal structure of the flexible board will be described below with reference to a schematic diagram illustrated in FIG. 11. The illustrated example is a cross-sectional view schematically illustrating an overlapping portion of the flexible board FB1 and the flexible board FB2, and is a cross-section along a plane perpendicular to the extending direction the wiring line of the flexible board FB1. The flexible board FB1 includes a plurality of wiring lines LL, and in the illustrated example, the plurality of wiring lines are arranged alternately or zigzag in a cross-sectional view. As a result, a certain distance is provided between each wiring line LL. In addition, for a large number of wiring lines LL, it is possible to avoid interference between signal lines by alternately arranging ground lines and signal lines for transmission such that the signal lines are not adjacent to each other. While only the flexible board FB1 is illustrated and the internal structure of the flexible board FB2 is omitted in the above description, the flexible board FB2 may also have the same configuration. Note that, in one layer constituting the flexible board FB1 in the illustrated example, a conductive copper foil part CL that forms a circuit is first provided on a base material BS, and a coverlay VL is provided thereon with a coverlay adhesive AD therebetween. Note that an adhesive layers AL1 and AL2 are formed by applying a conductive adhesive on both surfaces thereof. A plurality (in the drawing, two) of the above-described layers are stacked.

Figure 12:
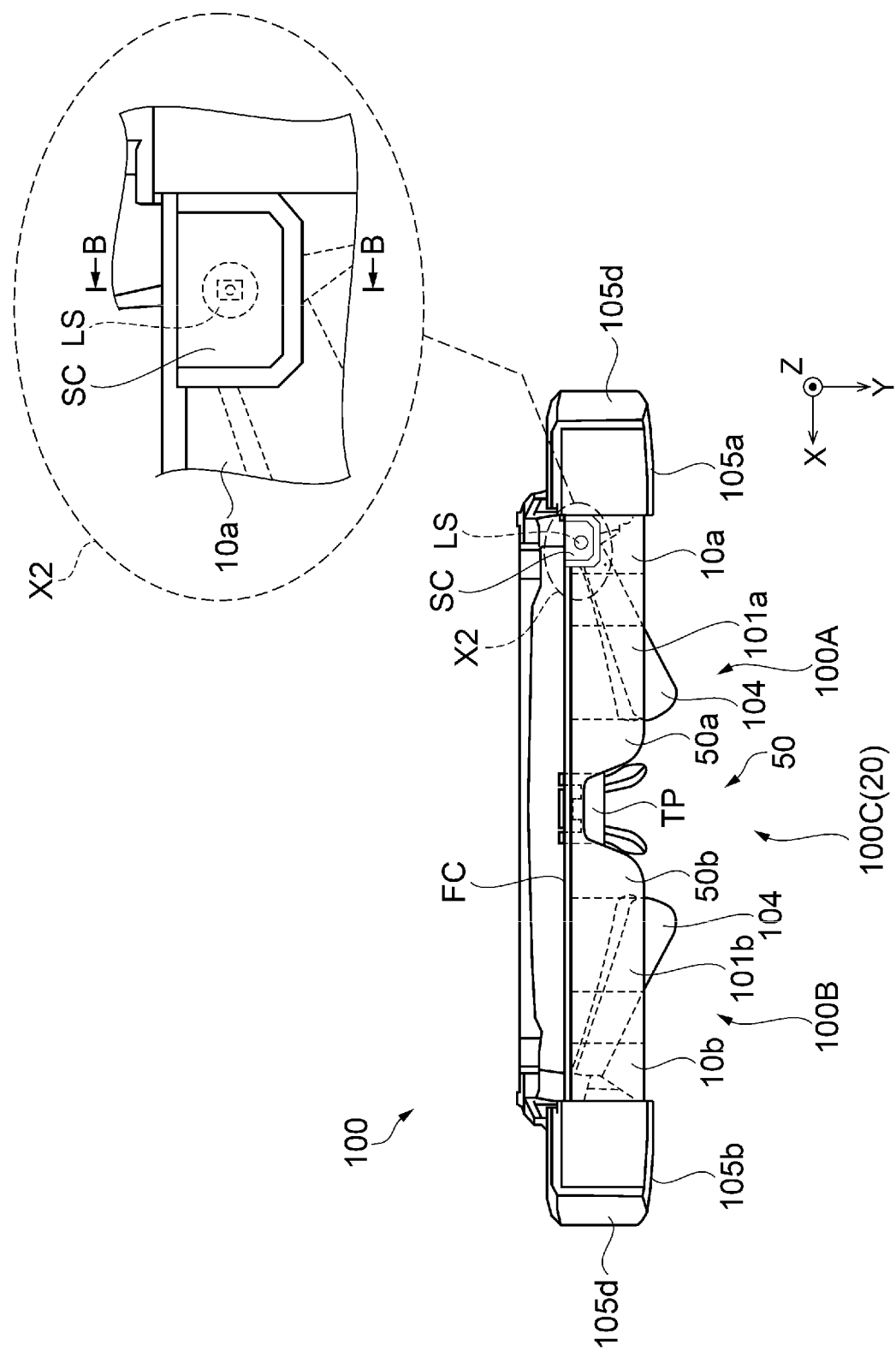
FIG. 12 is a front view for describing an exemplary illuminance sensor.
Figure 13:
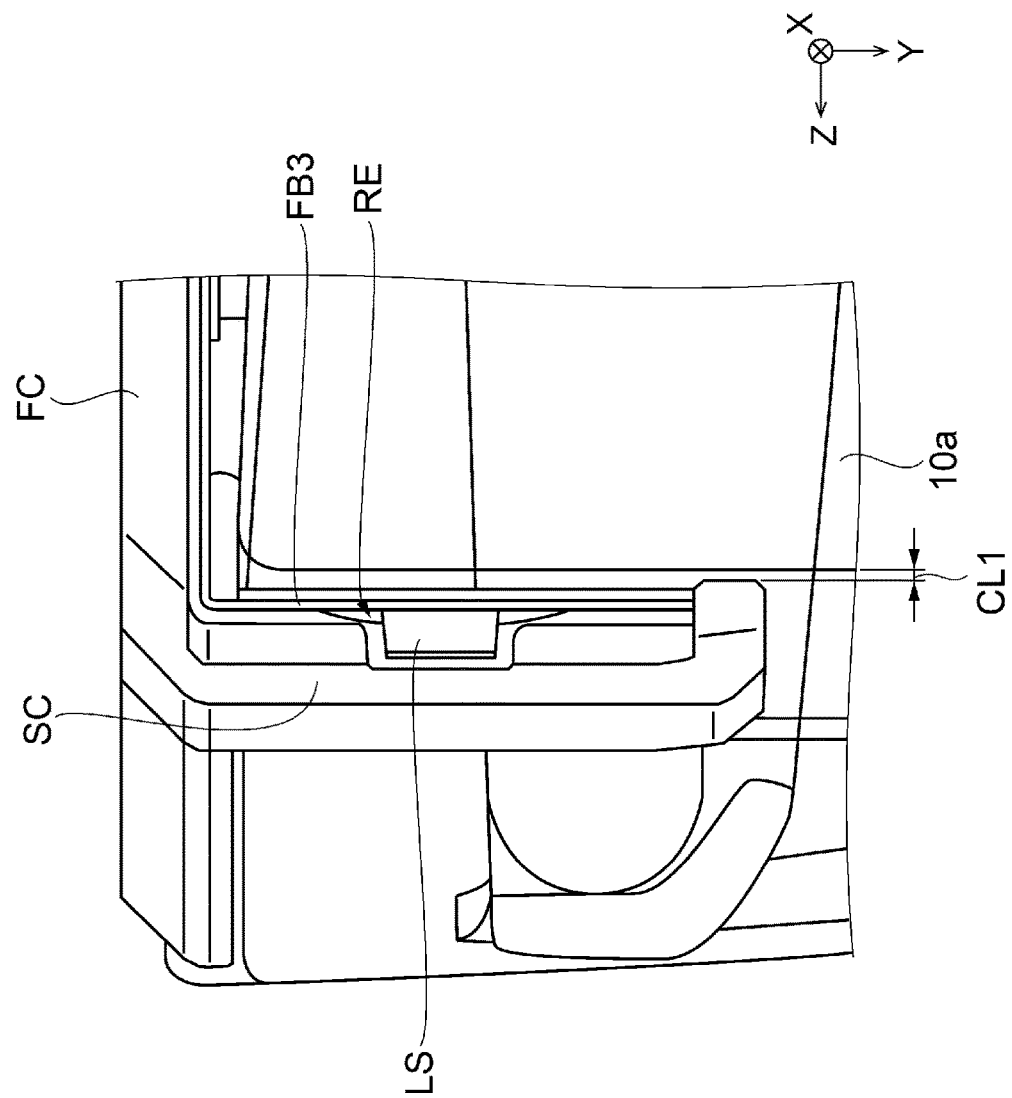
FIG. 13 is an enlarged side cross-sectional view of a portion including the illuminance sensor in the wearable display device.

An exemplary arrangement and assembly of the illuminance sensor LS will be described below with reference to FIG. 12 and the like. FIG. 12 is a front view for describing an exemplary illuminance sensor LS provided in the wearable display device 100, and FIG. 13 is an enlarged side cross-sectional view of a portion including the illuminance sensor LS in the wearable display device 100.

As described above, the illuminance sensor LS is an external light sensor that measures the ambient light intensity, and is provided in the first display device 100A in the wearable display device 100 including the first display device 100A and the second display device 100B as illustrated in FIG. 12. More specifically, the illuminance sensor LS is provided in a corner region where it less impairs the visibility of the viewer on the front surface side, i.e., the +Z side in the surface of the light-guiding member 10a of the first display device 100A that is opposite to the eye of the viewer. In the illustrated example, the illuminance sensor LS is located on the left side (the −X side) and the upper side (the −Y side) as viewed from the viewer. This region may be a region located on the optical path in propagation of the image light GL illustrated with reference to FIG. 6. As such, in this embodiment, the illumination sensor LS and the flexible board FB3 coupled thereto are maintained in a state where it is spaced apart from the surface of the light-guiding member 10a as illustrated in FIG. 13 so as not to inhibit the propagation of the image light GL.

Specifically, as illustrated in FIG. 12 and a partially enlarged view of the portion indicated by the dashed lines X2 in FIG. 12, the illuminance sensor LS is structured to be attached to an illuminance sensor cover member SC extending from the cover member FC. Further, as illustrated in FIG. 13, which is a cross-sectional view taken along the line BB in the dashed line X2, the illuminance sensor LS is embedded in a recess RE provided in the illuminance sensor cover member SC. In addition, the flexible board FB3 that is coupled to the illuminance sensor LS is bonded and fixed to a planar portion around the recess RE in the cover member FC, for example. In the above-described manner, the illuminance sensor LS and the flexible board FB3 is attached to the illuminance sensor cover member SC, and in turn, the cover member FC while maintaining a state with a clearance CL1 from the surface of the light-guiding member 10a in the Z direction.

Figure 14:
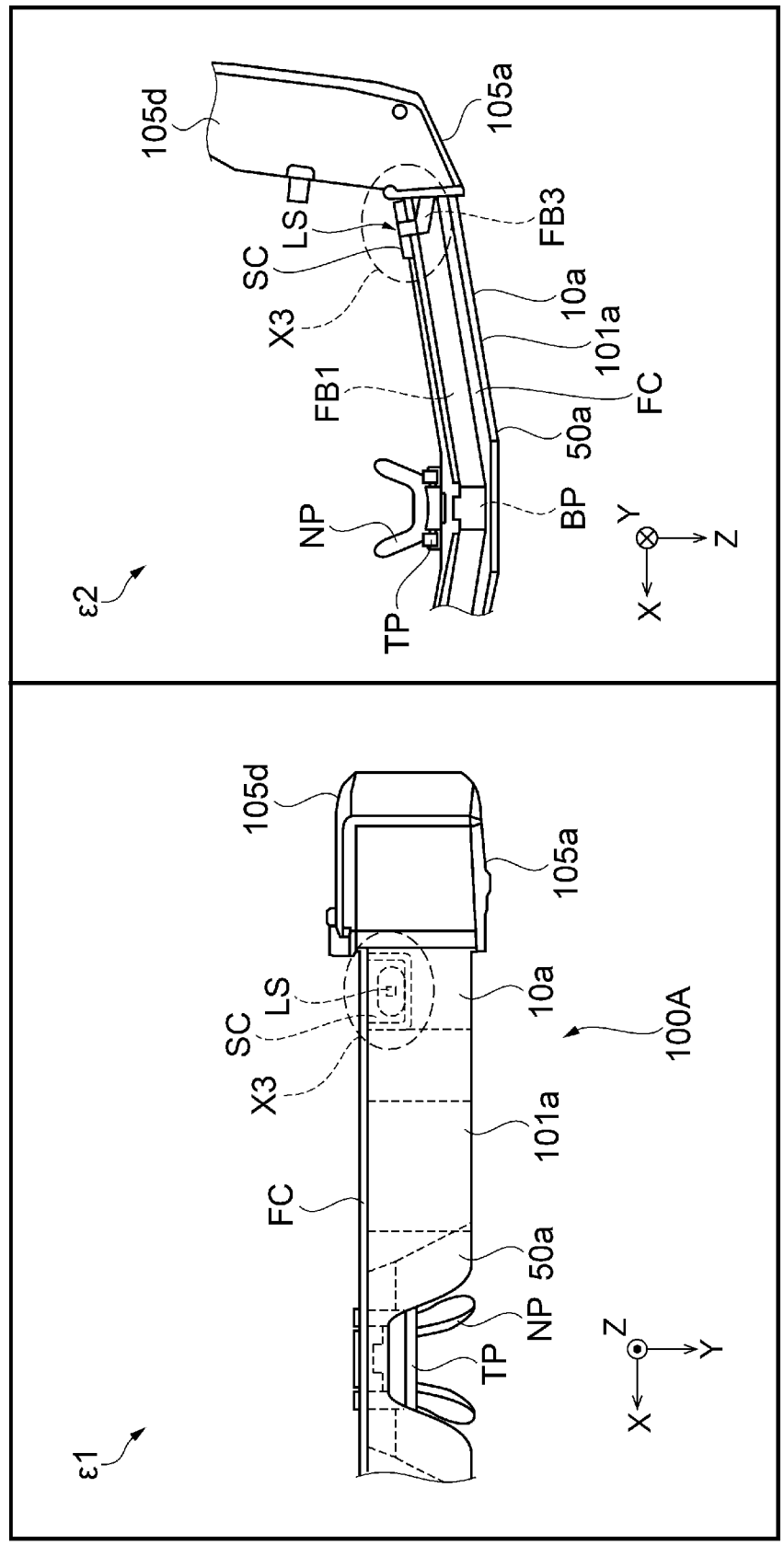
FIG. 14 is a view for describing a modification of the illuminance sensor.
Figure 15:
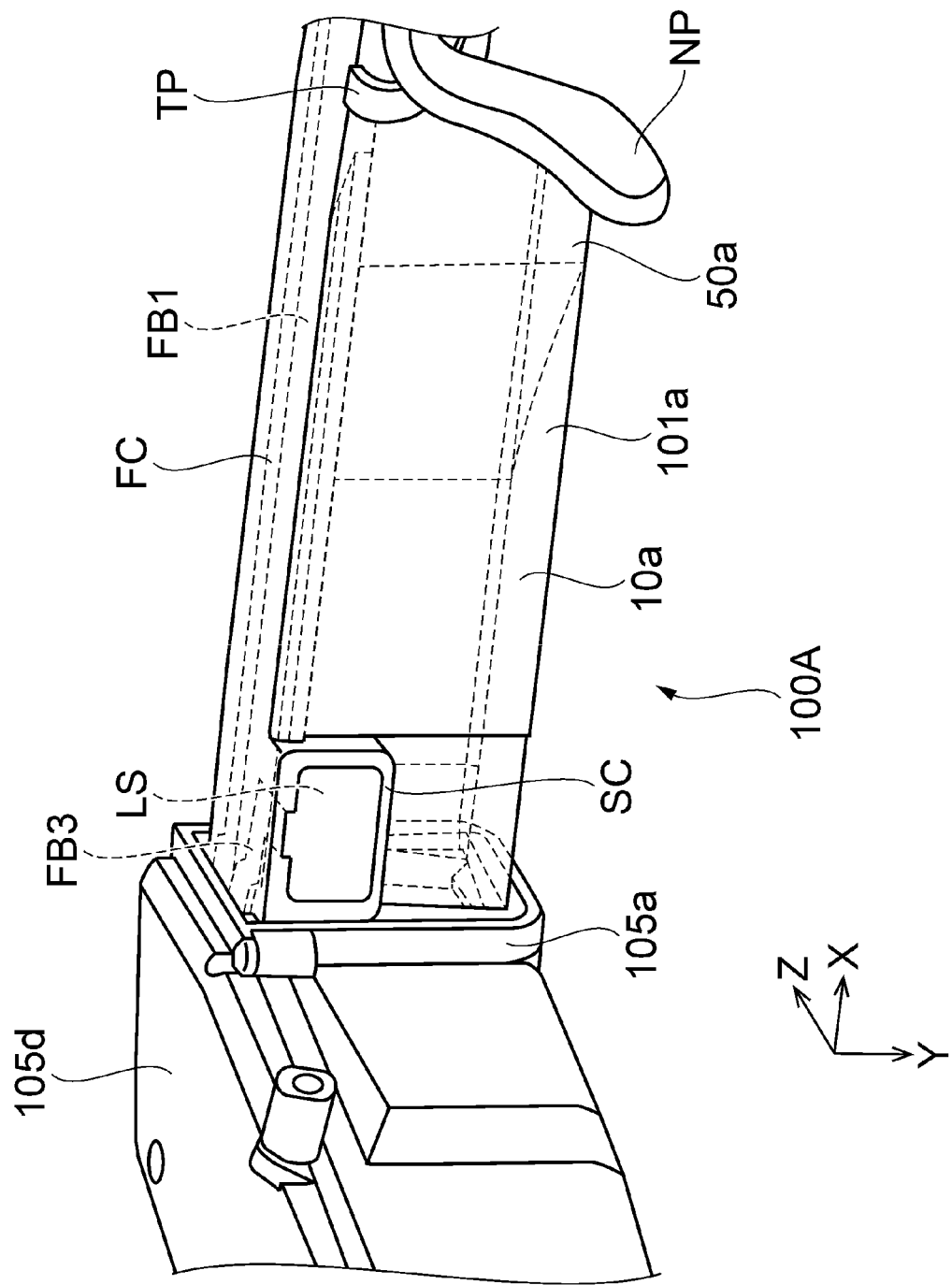
FIG. 15 is a partially enlarged perspective view of the illuminance sensor of FIG. 14 in the wearable display device.

A modification of the arrangement and assembly of the illuminance sensor LS will be described below with reference to FIGS. 14 and 15. In FIG. 14, a state ε1 is a front view illustrating a portion where the illuminance sensor LS is provided in the wearable display device 100, and the state ε2 is a plan view. In addition, FIG. 15 is a perspective view of the illuminance sensor LS of FIG. 14 as viewed from a different perspective or angle.

In the illustrated modification, unlike the above-described example, the illuminance sensor LS is provided in a corner region where it less impairs the visibility of the viewer on the rear surface side, i.e., the –Z side in the surface of the light-guiding member 10a of the first display device 100A that is opposite to the eye of the viewer. In the illustrated example, the illuminance sensor LS is located on the left side (the –X side) and the upper side (the –Y side) as viewed from the viewer. This region may also be a region located on the optical path in propagation of the image light GL illustrated with reference to FIG. 6. As such, also in this case, the illumination sensor LS and the flexible board FB3 are structured to maintain a state with a clearance from the surface of the light-guiding member 10a as in the above-described exemplary case.

As described above, the wearable display device 100 according to this embodiment includes the first display device 100A and the second display device 100B configured to display an image corresponding to left and right eyes; the first flexible board FB1 extending from the first display device 100A to the second display device 100B, the first flexible board FB1 being configured to transmit a signal; and the second flexible boards FB2 and FB 3 disposed on the first flexible board FB1 in an overlapping manner. The first flexible board FB1 includes a surface adjoining the second flexible board FB2 and a surface opposite to the surface adjoining the second flexible board FB2, the surface opposite to the surface adjoining the second flexible board FB2 being shielded; and the second flexible board FB2 includes a surface adjoining the first flexible board FB1 and a surface opposite to the surface adjoining the first flexible board FB1, the surface opposite to the surface adjoining the first flexible board FB1 being shielded.

In the above case, first, the thickness of the cable can be reduced by employing the flexible boards FB1 to FB3 for signal transmission. In particular, the design of the device can be improved by reducing the thickness of the wiring line at the portion extending from one side to the other in the left and right direction. Further, in the case of the above-described aspect, a state where the entirety of the overlapped flexible boards is reliably shielded can be achieved even when the flexible board FB1 and the flexible board FB2 including the high-speed signal line are used in an overlapping manner as a plurality of flexible boards. Thus, even when the processing speed of image data or the like in transmission is increased, noise received from the outside can be handled.

In addition, in this embodiment, the cover member FC that houses the flexible board FB1 is provided, the first display device 100A and the second display device 100B include the light-guiding device 20 that guides image light, and the flexible board FB1 is shielded and attached to the cover member FC such that the flexible board FB1 is spaced apart from the light-guiding device 20.

In the above case, even in the case where the flexible board FB1 is shielded and the amount of data such as image data in transmission is increased, noise received from the outside can be handled. Further, by attaching the flexible board FB1 to the cover member FC and separating the flexible board from the light-guiding device 20, a situation where the optical function of the light-guiding device 20 is affected by the flexible board is avoided or reduced.

Second Embodiment

A wearable display device according to a second embodiment will be described below with reference to FIG. 16 and the like. Note that the wearable display device according to this embodiment is different from the first embodiment in that the wearable display device is equipped with an image-capturing camera and in the configuration of a wiring line or a flexible board associated therewith. However, other points are the same as those of the first embodiment, and therefore the detailed descriptions of the other components will be omitted.

Figure 16:
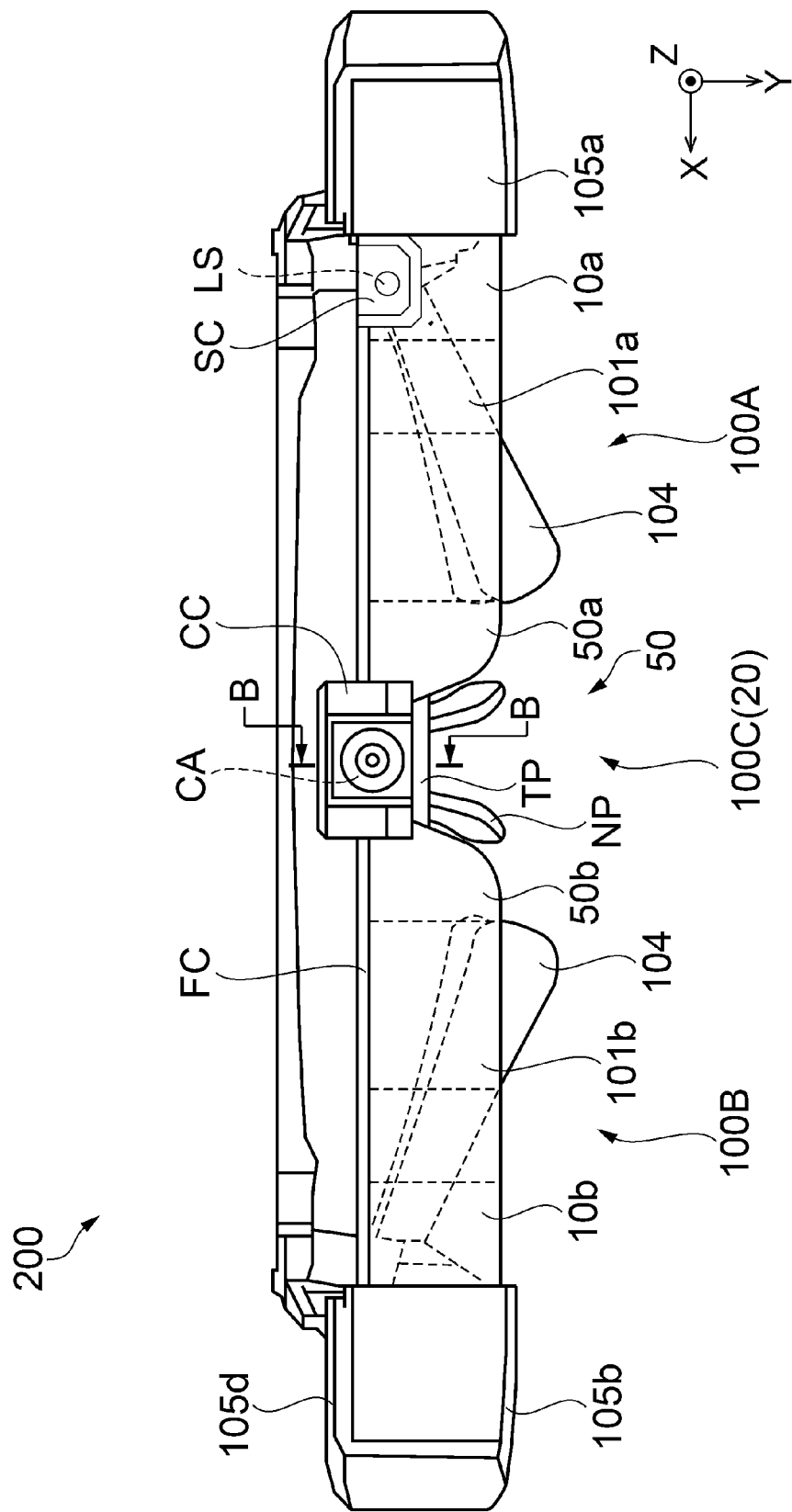
FIG. 16 is a front view of an external appearance of a wearable display device according to a second embodiment.
Figure 17:
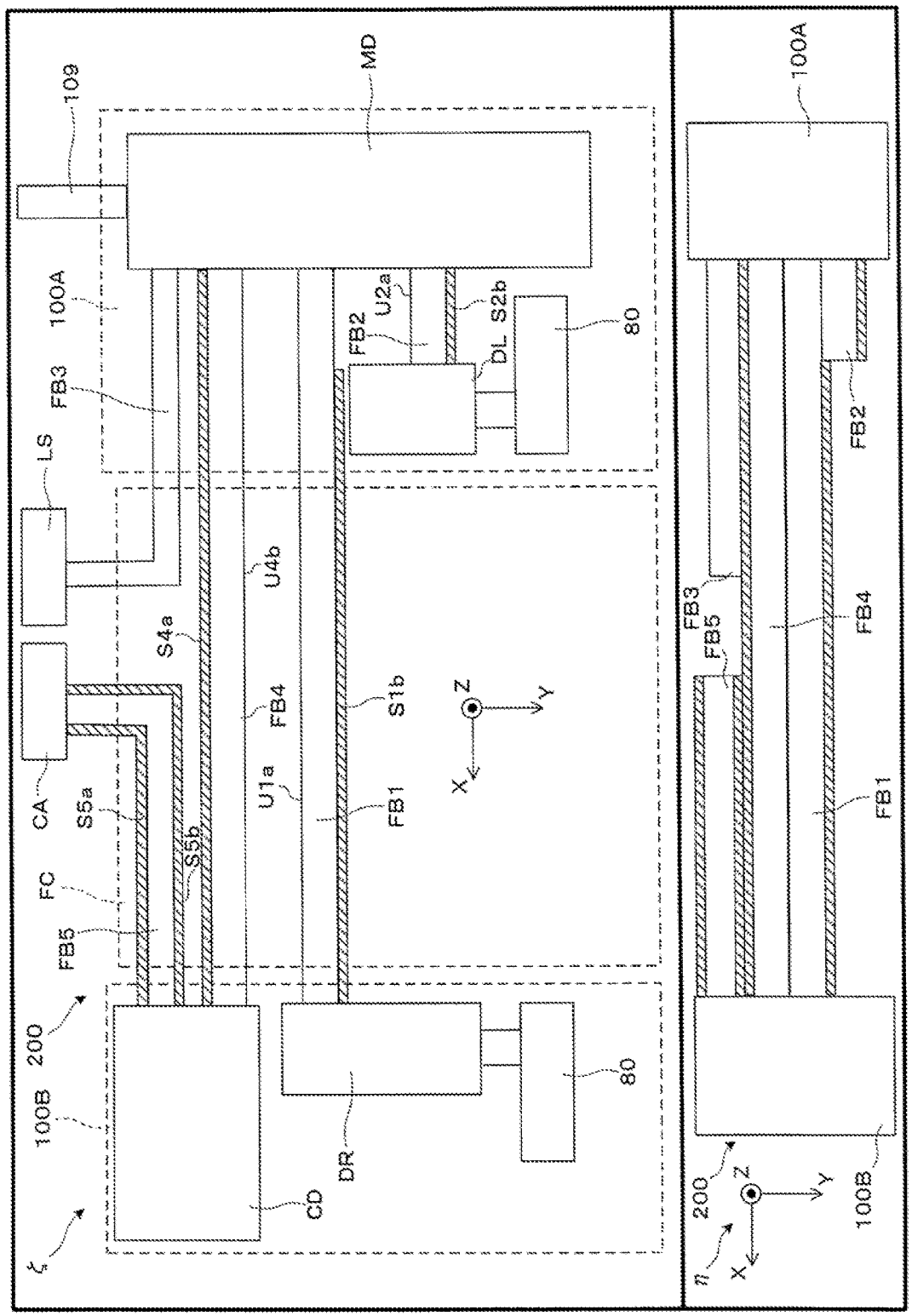
FIG. 17 is a schematic block diagram illustrating a circuit configuration of the wearable display device.

FIG. 16 is a front view illustrating an external appearance of a wearable display device 200 according to this embodiment, and corresponds to FIG. 12. FIG. 17 is a schematic block diagram illustrating an exemplary circuit configuration of the wearable display device 200, and corresponds to FIG. 5.

As illustrated in the drawings, the wearable display device 200 according to this embodiment has a configuration in which a camera CA is provided at the center of the device in addition to the components constituting the wearable display device 100 illustrated with reference to FIG. 2 and the like in the first embodiment. As illustrated in FIG. 17, a camera circuit board CD for driving the camera CA is provided in the second display device 100B in the wearable display device 200. Further, in association with the employment of the camera circuit board CD, the wearable display device 200 includes a camera-controlling flexible board FB4 that couples the main circuit board MD and the camera circuit board CD, and a camera-driving flexible board FB5 that couples the camera circuit board CD and the camera CA. Specifically, regarding the main circuit board MD, the camera circuit board CD is a drive circuit board that drives the camera CA by operating under the control of the main circuit board MD.

Note that, also in this embodiment, the right-eye flexible board FB1 is used as the first flexible board, and the flexible boards FB2 to FB5, which are flexible boards other than the first flexible board and are disposed on the first flexible board in an overlapping manner, are used as the second flexible board as in the first embodiment.

The camera CA is an image-capturing camera composed of, for example, an solid-state image-capturing element such as a CCD and a CMOS, and is an external light sensor that captures (takes) an external image corresponding to a line of sight of the viewer. As illustrated in FIG. 16, the camera CA is disposed in a center position, i.e., in a position between the eyes of the viewer, as with the nose pad NP and the fitting TP thereof. Thus, occurrence of deviation between the visual recognition direction of the viewer and the camera image can be reduced. Therefore, it is possible to increase the accuracy in an AR (augmented reality) function or the like, for example. If the camera CA is disposed in a side direction, such as the second image forming body part 105b side, for example, the accuracy in an AR function or the like may be impaired. Further, when used by a viewer with long hair, the hair may block the front side of the camera lens of the camera CA and the function may be reduced. In the present configuration, the camera CA is disposed at the center, and thus the above-described situation can be avoided or reduced.

Configurations of the flexible boards FB1 to FB5 will be described below with reference to the schematic block diagram of FIG. 17.

A state ζ illustrated in the upper section in FIG. 17 illustrates a circuit configuration, i.e., a connection state of parts in the wearable display device 200. In addition, a state where the flexible boards FB1 to FB5 are disposed in an overlapping manner is schematically illustrated as a state η in the lower section. As illustrated in the drawing, in this example, the flexible board FB2 is disposed lowermost (on the +Y side), the flexible board FB1 is disposed in an overlapping manner on the upper side (the −Y side) thereof, the flexible board FB4 is disposed in an overlapping manner on the upper side (the −Y side) thereof, and the flexible board FB3 and the flexible board FB5 are disposed in an overlapping manner on the upper side (the −Y side) thereof, in the overlapping direction, i.e., the Y direction.

First, in the flexible boards FB1 to FB5, the right-eye flexible board FB1 and the left-eye flexible board FB2 include the high-speed signal line so as to operate for transmission of image data to be displayed by the display element 80. On the other hand, the illuminance sensor flexible board FB3 does not necessarily need to employ the high-speed signal line, and here the flexible board FB3 does not include the high-speed signal line.

Conversely, the camera-controlling flexible board FB4 and the camera-driving flexible board FB5 include the high-speed signal line so as to operate for transmission of image data of images captured by the camera CA.

Here, it is conceivable that the camera-controlling flexible board FB4 and the camera-driving flexible board FB5 also function as a power supply cable for driving the camera CA and the camera circuit board CD as well as a transmission cable for image data.

As described above, in this embodiment, the flexible boards FB1, FB2, FB4 and FB5 other than the flexible board FB3 include the high-speed signal line, and, by disposing the boards, a wiring line having a thin and space-saving configuration can be achieved while achieving transmission of a large amount of data.

At this time, as a countermeasure against noise received from the outside, the wearable display device 200 is configured such that the flexible boards FB1, FB2, FB4 and FB5 including the high-speed signal line are entirely shielded. In the illustrated example, as illustrated in the state η, the flexible boards FB1 and FB2 form the lowermost layer side (the +Y side), and the flexible boards FB4 and FB5 form the uppermost layer side (the −Y side) in the flexible boards FB1, FB2, FB4 and FB5 including the high-speed signal line. For this configuration, first, the shield part S1b and the shield part S2b are provided on the lower side (the +Y side) of the flexible boards FB1 and FB2 that form the lowermost layer side (the +Y side). Further, a shield part S4a and a shield part S5a are provided on an upper side (the −Y side) of the flexible boards FB4 and FB5 that form the uppermost layer side (the −Y side).

Note that, in the illustrated example, the flexible board FB5 that is coupled to the camera CA is independently shielded in its entirely on the assumption that the wiring line is independently provided without overlapping with the others. Specifically, the flexible board FB5 is provided with a shield part S5b on the lower layer side (the +Y side) in addition to the shield part S5a provided on the upper layer side (the −Y side). By electrically coupling the shield part S5a and the shield part S5b, the entirety can be independently shielded.

In addition, for the above-described configuration, the shield part S4a is entirely provided on the upper layer side (the −Y side) of the flexible board FB4 such that the remaining flexible boards FB1, FB2 and FB4 including the high-speed signal line are entirely shielded even when the flexible board FB5 is not disposed in an overlapping manner.

In other words, it can be said that, in the above-described configuration, the surface opposite to the adjoining surface is shielded at a location where one flexible board and another flexible board overlap. For example, in the flexible board FB1 and the flexible board FB4, the shield part S1b and the shield part S4a are provided on the surfaces opposite to the adjoining surface. On the other hand, an adjoining surface U1a and an adjoining surface U4b, each of which is an adjoined surface, are not shielded. As described above, by preventing the shield part from being excessively increased while maintaining the required shielding properties, a situation where the flexibility of the flexible board is lost due to the increased shield part is reduced.

Figure 18:
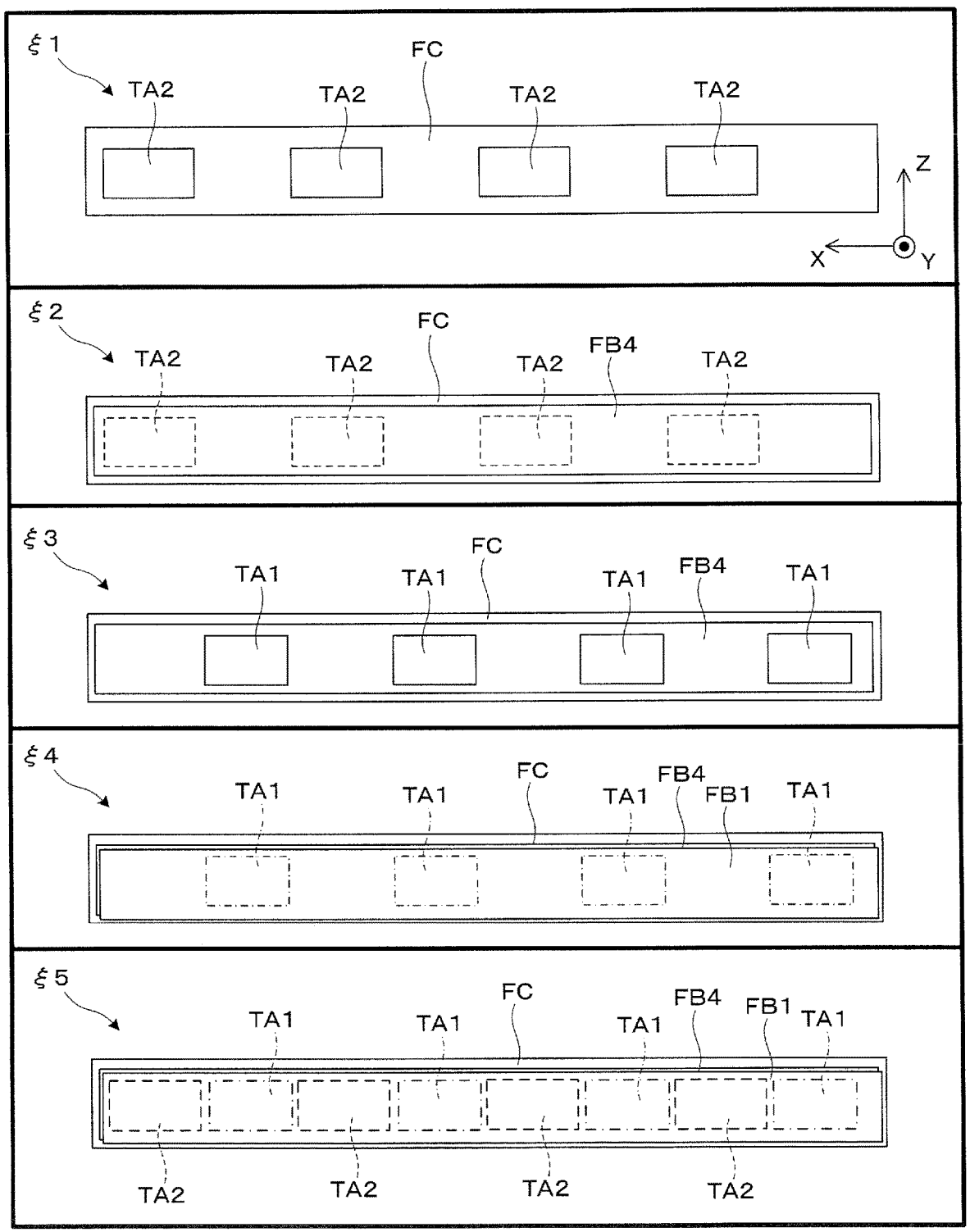
FIG. 18 is a plan view schematically illustrating a method for fixing the flexible board.

An exemplary method of attaching (fixing) the flexible board to the cover member FC will be briefly described below with reference to the schematic plan view of FIG. 18. Here, the attaching of the camera-controlling flexible board FB4 and the right-eye flexible board FB1 having the longest overlapping portion in the flexible boards FB1 to FB5 is described. Here, the flexible board FB1, which is the first flexible board, is bonded using the first tape member TA1, and the flexible board FB4, which is the second flexible board, is bonded using the second tape member TA2.

First, as illustrated in a step ξ1, the adhesive second tape member TA2 for fixing the flexible board FB4 is attached to the back side (the +Y side) surface of the cover member FC, and then, as illustrated in a step 2, the flexible board FB4 is bonded to the second tape member TA2. Note that, in the above-described steps, a plurality of the second tape members TA2 are intermittently bonded along the extending direction of the cover member FC as illustrated in the drawing.

Next, as illustrated in a step ξ3, the adhesive first tape member TA1 for fixing the flexible board FB1 is attached to the front side (the +Y side) surface of the flexible board FB4 fixed in step ξ2, and the flexible board FB1 is bonded to the first tape member TA1 as illustrated in a step ξ4. Note that, in the above-described steps, the plurality of first tape members TA1 are intermittently disposed along the extending direction of the cover member FC as illustrated in the drawing. Further, with regard to the above-described bonding, the first tape members TA1 and the second tape members TA2 are alternately arranged without overlapping each other as illustrated in a state ξ5. Thus, the increase in thickness in the Y direction due to the overlapping of the tape members is reduced.

Figure 19:
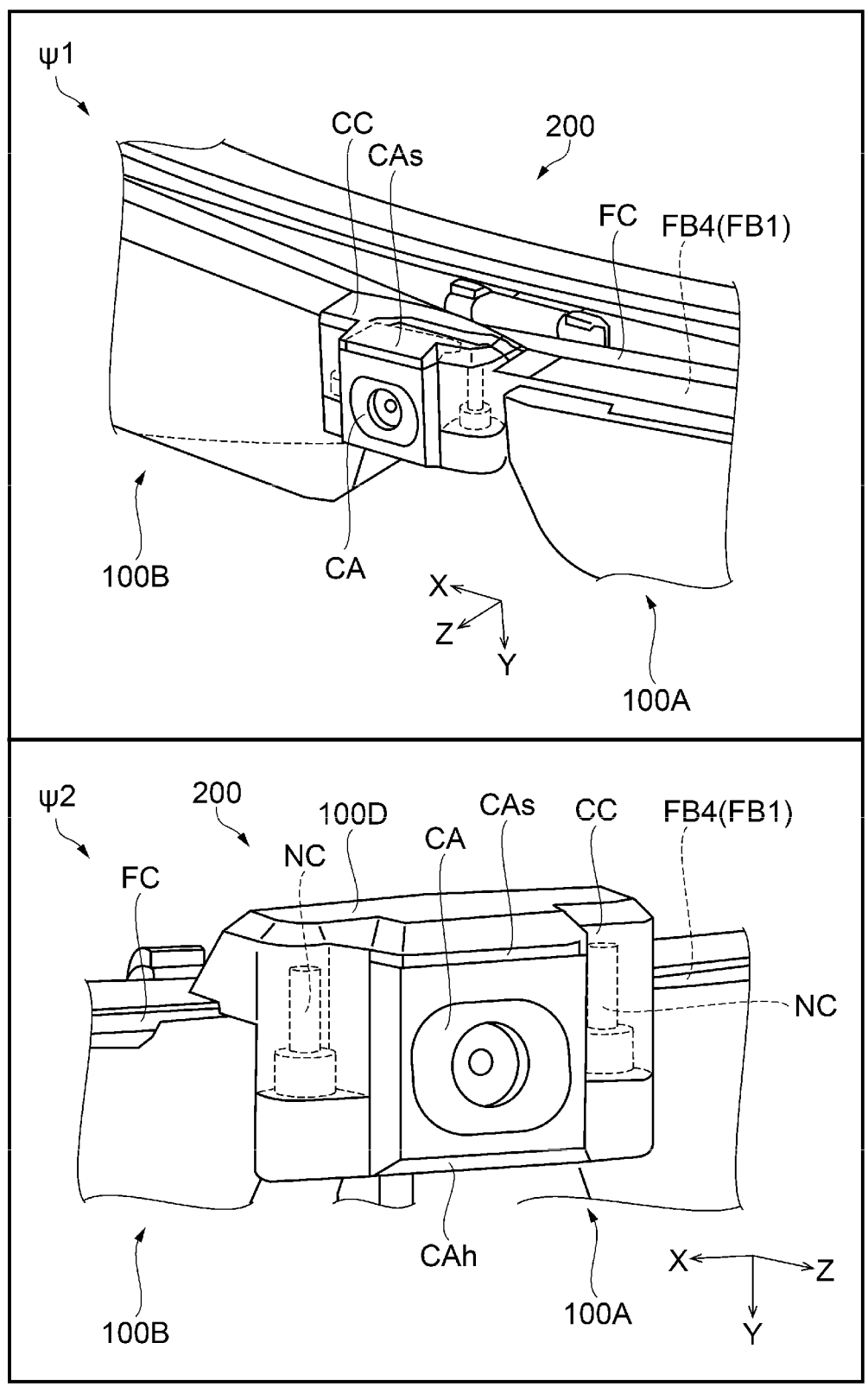
FIG. 19 is a perspective view for describing a structure of an exemplary camera.
Figure 20:
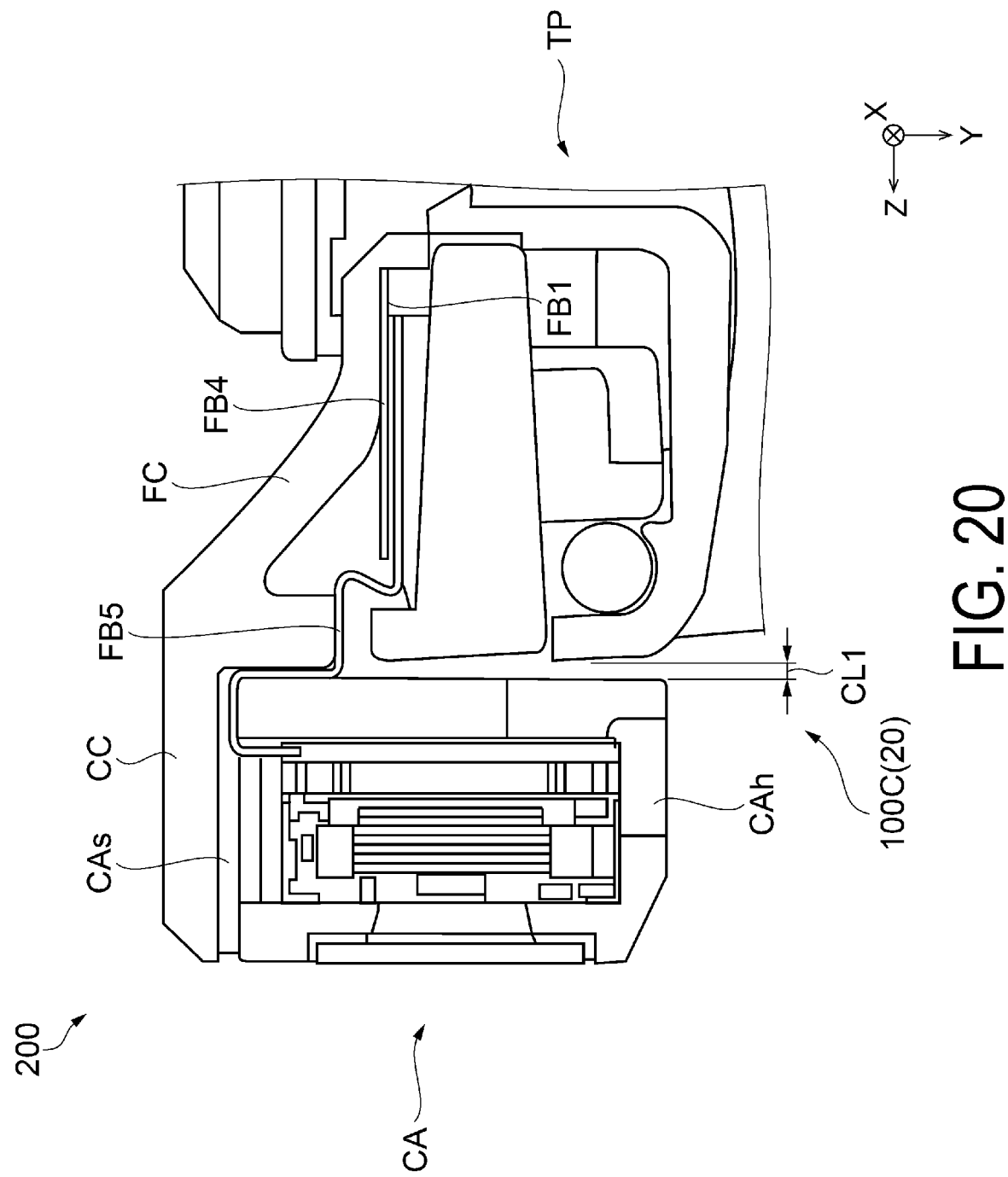
FIG. 20 is a side cross-sectional view for describing an internal structure of the camera of FIG. 19.

An exemplary arrangement and assembly of the camera CA will be described below with reference to FIG. 19 and the like. FIG. 19 is a perspective view for describing an exemplary camera CA provided in the wearable display device 200, and FIG. 20 is a side cross-sectional view for describing an internal structure of the camera CA illustrated in FIG. 19. Note that, in FIG. 19, a state ψ1 illustrated in the upper section and a state ψ2 illustrated in the lower section are partially enlarged perspective views of the camera CA illustrated in FIG. 16 as viewed from different angles (views), and FIG. 20 is a cross-sectional view taken along the line CC in FIG. 16.

As described above, the camera CA is an external light sensor for capturing (taking) an external image corresponding to a line of sight of the viewer, and is configured to be attached to a camera cover member CC extending from the cover member FC located at a center position between the first display device 100A and the second display device 100B constituting the wearable display device 200 as illustrated in the drawing.

The camera CA is housed in a camera holder CAh having a housing shape so as to maintain an air-tight or fluid-tight state. Further, the camera CA is sealed within the camera holder CAh by screw-fixing the camera holder CAh to the camera cover member CC with a screwing part NC in a state where a sealing sheet member CAs is sandwiched between the camera holder CAh and the camera cover member CC. Note that the camera CA and the flexible board FB5 are attached to the cover member FC, and in turn, the camera cover member CC while maintaining a state with the clearance CL1 from the surface of the light-guiding device 20 in the Z direction.

Also in this embodiment, by employing the flexible boards FB1 to FB5 for the transmission of the signal, the thickness of the cable can be reduced, and a state where the entirety of the overlapped flexible boards is reliably shielded can be achieved even when the flexible boards including the high-speed signal line are used in an overlapping manner. Thus, even when the processing speed of image data or the like in transmission is increased, noise received from the outside can be handled.

In addition, even in the case where the flexible board FB1, the flexible board FB4, and the like are shielded and the amount of data such as image data in transmission is increased, noise received from the outside can be handled. Further, by attaching the flexible board FB1 and/or the flexible board FB4 to the cover member FC and separating the flexible board from the light-guiding device 20, a situation where the optical function of the light-guiding device 20 is affected by the flexible board is avoided or reduced.

Modifications and Other Matters

While the display element 80 is an organic EL display panel or an LCD panel in the above-described embodiments, the display element 80 may be a self-luminous display element represented by an LED array, a laser array, a quantum dot light emitting element, or the like. Further, the display element 80 may be a display using a laser scanner including a combination of a laser light source and a scanner. Note that a liquid crystal on silicon (LCOS) technique may be used in place of an LCD panel.

In addition, the main circuit board MD, the left-eye circuit board DL, and the right-eye circuit board DR of FIG. 4 and the like, and the camera circuit board CD of FIG. 17 are composed of semiconductor elements such as operational elements and converting elements. Specifically, the main circuit board MD may be composed of a member including at least one circuit such as a digital signal processor (DSP), an application specific integrated circuit (ASIC), a programmable logic device (PLD), a field programmable gate array (FPGA), a graphics processing unit (GPU), and a central processing unit (CPU).

In addition, the outer case 105d is not limited to a magnesium alloy, and may be formed from aluminum or an aluminum alloy.

In addition, in the second embodiment, various cameras such as a camera for taking infrared light or the like and a camera for sensing temperature, as well as a camera for capturing a normal image, may be applied as the camera CA in accordance with the purpose. Further, in accordance with the purpose, the camera CA and the camera circuit board CD may be replaceable.

While the wearable display devices 100 and 200 are described as see-through head-mounted displays (HMD) in the above description, the wearable display device 100 and the like may not be a device that cannot enable see-through viewing of an external image, and may be an optical system for observing only a virtual image by blocking an external image.

As described above, a wearable display device of a first aspect includes a first display device and a second display device configured to display images correspondingly to left and right eyes, a first flexible board extending from the first display device to the second display device and configured to transmit a signal, and a second flexible board disposed overlapping the first flexible board. The first flexible board includes a surface overlapping the second flexible board and an opposite surface from the surface on top of the second flexible board, the opposite surface being shielded, and the second flexible board includes a surface overlapping the first flexible board and an opposite surface from the surface overlapping the first flexible board, the opposite surface being shielded.

In the above-described wearable display device, by employing a flexible board for signal transmission, the thickness of the cable can be reduced. In particular, the design of the device can be improved by reducing the thickness of the wiring line at the portion extending from one side to the other in the left and right direction. Further, in the case of the above-described aspect, even when a plurality of flexible boards are used in an overlapping manner, a state where the entirety of the overlapped flexible boards is reliably shielded can be achieved, and thus, even when the processing speed of image data or the like in transmission is increased, noise received from the outside can be handled.

In a specific aspect, a board positioning member configured to position the first flexible board is further provided. In this case, the first flexible board can be fixed at an appropriate position with the board positioning member.

In another aspect, the board positioning member is a reinforcing plate having a protruding shape. In this case, highly accurate positioning is achieved based on the protruding shape.

In yet another aspect, a first tape member that fixes the first flexible board and a second tape member that fixes the second flexible board are disposed such that the first tape member and the second tape member do not overlap. In this case, increase in thickness due to the tape members can be reduced.

In yet another aspect, the first flexible board is coupled to any of the first display device and the second display device, and the second flexible board is coupled to an external light sensor. In this case, the wiring lines can be collected with the first flexible board, and information from the external light sensor can be acquired with the second flexible board.

In yet another aspect, the first flexible board and the second flexible board each include a high-speed signal line. In this case, transmission of various data such as image data for providing a high-quality image can be achieved.

In yet another aspect, the first flexible board and the second flexible board are shielded with a ground mesh line. In this case, reliable shielding can be achieved.

In yet another aspect, a cover member that houses the first flexible board and the second flexible board is further provided. The first display device and the second display device include a light-guiding device configured to guide image light, and the first flexible board and the second flexible board are attached to the cover member and are spaced apart from the light-guiding device. In this case, a situation where the optical function of the light-guiding device is affected by the flexible board can be avoided or reduced.

In yet another aspect, the cover member is fixed, at three sites that are a center thereof and both ends thereof, to the first display device and the second display device. In this case, a desired fixing state of the flexible board can be maintained by reliably fixing the cover member.

In yet another aspect, the first display device and the second display device are integrally coupled members, and include a flat surface extending flush from the first display device to the second display device, and the first flexible board extends along the flat surface. In this case, the thickness of the wiring portion extending from one side to the other in the left and right direction can be reduced.

As described above, a wearable display device of a second aspect includes a first display device and a second display device configured to display images correspondingly to left and right eyes, a flexible board extending from the first display device to the second display device and configured to transmit a signal, and a cover member configured to house the flexible board. The first display device and the second display device include a light-guiding device configured to guide image light, and the flexible board is shielded and attached to the cover member such that the flexible board is spaced apart from the light-guiding device.

In the above-described wearable display device, by employing a flexible board for signal transmission, the thickness of the cable can be reduced. In particular, the design of the device can be improved by reducing the thickness of the wiring line at the portion extending from one side to the other in the left and right direction. In addition, in the case of the above-described aspect, noise received from the outside can be handled even in the case where the flexible board is shielded and the amount of data such as image data in transmission is increased. Further, by attaching the flexible board to the cover member such that the flexible board is spaced apart from the light-guiding device, a situation where the optical function of the light-guiding device is affected by the flexible board is avoided or reduced.

In yet another aspect, a board positioning member configured to position the flexible board with respect to the cover member is provided. In this case, the flexible board can be fixed at an appropriate position with the board positioning member.

In yet another aspect, the first display device and the second display device are integrally coupled members, and include a flat surface extending flush from the first display device to the second display device, and the flexible board and the cover member extend along the flat surface. In this case, the thickness of the wiring portion extending from one side to the other in the left and right direction can be reduced.

What is claimed is:

1. A wearable display device comprising:
   a first display device and a second display device that display an image corresponding to a left eye and an image corresponding to a right eye, respectively;
   a first flexible board that extends from the first display device to the second display device and that transmits a signal;
   a second flexible board disposed that overlaps with the first flexible board; and
   a reinforcing plate that positions the first flexible board and that has a protruding shape, wherein
   the first flexible board includes a first surface facing a second surface of the second flexible board and a first opposite surface that is opposite to the first surface, the first opposite surface being shielded, and
   the second flexible board includes a second opposite surface opposite to the second surface, the second opposite surface being shielded.

2. The wearable display device according to claim 1, wherein a first tape member that fixes the first flexible board and a second tape member that fixes the second flexible board are disposed such that the first tape member and the second tape member do not overlap.

3. The wearable display device according to claim 1, wherein
   the first flexible board is coupled to any of the first display device and the second display device, and
   the second flexible board is coupled to an external light sensor.

4. The wearable display device according to claim 1, wherein the first flexible board and the second flexible board each include a high-speed signal line.

5. The wearable display device according to claim 1, wherein the first flexible board and the second flexible board are shielded with a ground mesh line.

6. The wearable display device according to claim 1, further comprising a cover member that houses the first flexible board and the second flexible board, wherein
   the first display device and the second display device include a light-guiding device configured to guide image light, and
   the first flexible board and the second flexible board are attached to the cover member and are spaced apart from the light-guiding device.

7. The wearable display device according to claim 6, wherein the cover member is fixed, at three sites that are a center thereof and both ends thereof, to the first display device and the second display device.

8. The wearable display device according to claim 1, wherein
   the first display device and the second display device are integrally coupled members, and include a flat surface extending flush from the first display device to the second display device, and
   the first flexible board extends along the flat surface.

9. A wearable display device comprising:
   a first display device and a second display device that display an image corresponding to a left eye and an image corresponding to a right eye, respectively;
   a flexible board that extends from the first display device to the second display device and that transmits a signal;
   a reinforcing plate that positions the flexible board and that has a protruding shape; and a cover member configured to house the flexible board, wherein the first display device and the second display device include a light-guiding device configured to guide image light; and the flexible board is shielded and attached to the cover member such that the flexible board is spaced apart from the light-guiding device.

10. The wearable display device according to claim 9, wherein the reinforcing plate positions the flexible board with respect to the cover member.

11. The wearable display device according to claim 9, wherein the first display device and the second display device are integrally coupled members, and include a flat surface extending flush from the first display device to the second display device, and the flexible board and the cover member extend along the flat surface.

\* \* \* \* \*